United States Patent
Dunn et al.

(10) Patent No.: US 12,020,170 B2
(45) Date of Patent: Jun. 25, 2024

(54) SYSTEMS AND METHODS FOR INTENT DISCOVERY AND PROCESS EXECUTION

(71) Applicant: LIVEPERSON, INC., New York, NY (US)

(72) Inventors: Matthew Dunn, Arlington, MA (US); Michael Higgins, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 17/749,435

(22) Filed: May 20, 2022

(65) Prior Publication Data

US 2022/0374728 A1 Nov. 24, 2022

Related U.S. Application Data

(60) Provisional application No. 63/192,312, filed on May 24, 2021.

(51) Int. Cl.
| | |
|---|---|
| *G06N 20/00* | (2019.01) |
| *G06N 3/084* | (2023.01) |
| *G06N 5/022* | (2023.01) |
| *G06N 20/20* | (2019.01) |
| *G06Q 30/016* | (2023.01) |

(52) U.S. Cl.
CPC .......... *G06N 5/022* (2013.01); *G06Q 30/016* (2013.01)

(58) Field of Classification Search
CPC ............................ G06N 5/022; G06Q 30/016
See application file for complete search history.

(56) References Cited

U.S. PATENT DOCUMENTS

| | | | | |
|---|---|---|---|---|
| 5,754,939 | A * | 5/1998 | Herz ..................... | H04N 7/163 348/E7.071 |
| 9,715,495 | B1 * | 7/2017 | Tacchi ................... | G06F 40/30 |
| 9,727,906 | B1 * | 8/2017 | Sarmento .......... | G06Q 30/0631 |
| 10,444,945 | B1 * | 10/2019 | Fehlman, II ........... | G06F 16/34 |
| 2013/0124525 | A1 * | 5/2013 | Anderson ............ | G06F 16/285 707/737 |
| 2016/0085742 | A1 * | 3/2016 | Mahmud ............... | G06F 40/289 704/9 |
| 2016/0171540 | A1 * | 6/2016 | Mangipudi ........ | G06Q 30/0255 705/14.53 |
| 2016/0364460 | A1 * | 12/2016 | Shuster ................. | G06F 3/0488 |

(Continued)

FOREIGN PATENT DOCUMENTS

EP 3 543 874 A1 9/2019

OTHER PUBLICATIONS

International Search Report and Written Opinion dated Aug. 29, 2022 for PCT Application No. PCT/US2022/030205, 11 pages.

*Primary Examiner* — Brandon S Cole
(74) *Attorney, Agent, or Firm* — POLSINELLI LLP

(57) ABSTRACT

Disclosed embodiments provide a framework for intent discovery based on user input and execution of processes based on the discovered intents. An intent processing system provides, via an interface, a graphical representation of different intent clusters corresponding to different intents. An intent cluster includes a set of intent terms and/or phrases that can be used to submit a request or issue that is associated with an intent. As a user selects intent terms and/or phrases from an intent cluster via the interface, the intent processing system can identify actions that can be performed to address the user's request or issue.

21 Claims, 9 Drawing Sheets

(56) References Cited

U.S. PATENT DOCUMENTS

| | | |
|---|---|---|
| 2020/0097496 A1 | 3/2020 | Alexander et al. |
| 2020/0394360 A1 | 12/2020 | Dunn et al. |
| 2021/0103634 A1* | 4/2021 | Gkikas ................. G06F 40/211 |
| 2022/0067101 A1* | 3/2022 | Appel .................... G06F 40/30 |
| 2022/0094648 A1* | 3/2022 | Le .......................... G06N 3/045 |

* cited by examiner

SYSTEMS AND METHODS FOR INTENT DISCOVERY AND PROCESS EXECUTION

CROSS-REFERENCE TO RELATED APPLICATIONS

The present patent application claims the priority benefit of U.S. Provisional Patent Application No. 63/192,312 filed May 24, 2021, the disclosures of which are incorporated by reference herein.

FIELD

The present disclosure relates generally to systems and methods for intent discovery based on user input and execution of processes based on the discovered intents. More specifically, techniques are provided to deploy a framework to identify intents based on inputs and cluster selections and to provide actionable responses to the identified intents.

SUMMARY

Disclosed embodiments may provide a framework for identifying intents based on inputs and cluster selections and to provide actionable responses to the identified intents. According to some embodiments, a computer-implemented method is provided. The computer-implemented method comprises generating a graphical representation of a set of intent clusters. An intent cluster includes a set of intent terms associated with an intent. The set of intent clusters are generated using a machine learning algorithm trained to cluster intent terms according to corresponding intents. The computer-implemented method further comprises detecting selection of one or more intent terms from an intent cluster of the set of intent clusters. The computer-implemented method further comprises identifying one or more actions corresponding to an intent associated with the intent cluster. The one or more actions are identified based on the intent and the one or more selected intent terms. The computer-implemented method further comprises facilitating performance of the one or more actions to fulfill the intent.

In some embodiments, the graphical representation of the set of intent clusters includes a set of spherical objects. Further, a spherical object includes a set of intent terms associated with an intent cluster.

In some embodiments, the set of intent clusters correspond to a set of frequently detected intents. The set of frequently detected intents are identified based on an evaluation of historical conversation data collected over a period of time.

In some embodiments, the graphical representation of the set of intent clusters is configured according to strikes zones of an interface.

In some embodiments, the computer-implemented method further comprises detecting a spike in requests associated with one or more intents. The computer-implemented method further comprises updating the graphical representation of the set of intent clusters. The graphical representation of the set of intent clusters is updated in real-time upon detection of the spike.

In some embodiments, the computer-implemented method further comprises updating the graphical representation of the set of intent clusters according to a request to promote a product. The request specifies one or more intents associated with the product.

In some embodiments, the computer-implemented method further comprises using one or more clustering algorithms to determine a number of intent clusters to be included in the set of intent clusters.

In an embodiment, a system comprises one or more processors and memory including instructions that, as a result of being executed by the one or more processors, cause the system to perform the processes described herein. In another embodiment, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The present disclosure is described in conjunction with the appended Figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
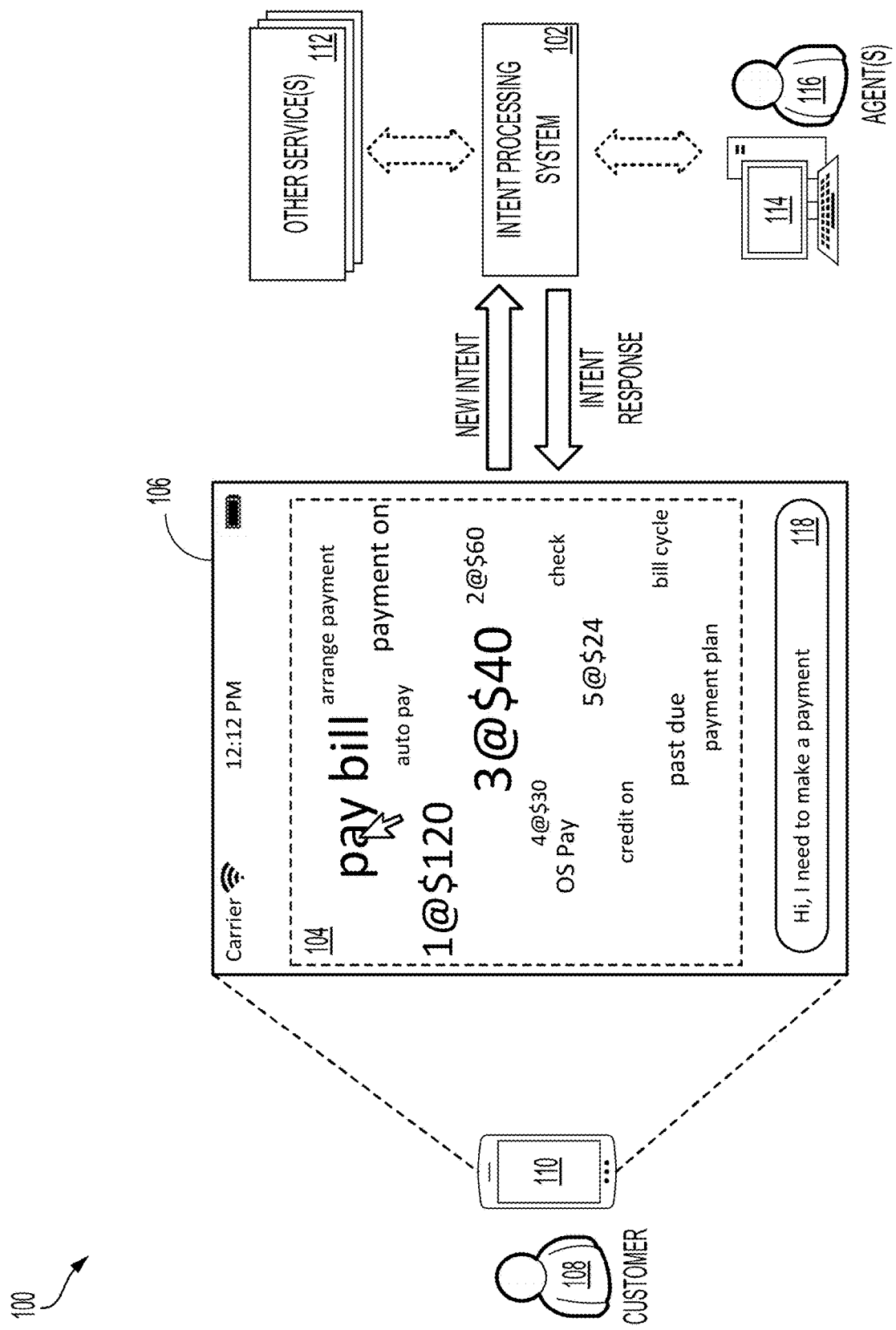
FIG. 1 shows an illustrative example of an environment in which various embodiments can be implemented.

FIG. 1 shows an illustrative example of an environment 100 in which various embodiments can be implemented. In the environment 100, a customer 108 of a particular brand or other entity may access an interface 106 provided by a brand interaction platform to submit a request to have an issue addressed. For instance, a customer 108 may submit a request to the brand interaction platform to submit a monthly payment associated with a service plan provided by the brand. As another example, a customer 108 may submit a request to the brand interaction platform to obtain troubleshooting information related to goods and/or services provided by the brand to the customer 108.

In an embodiment, the brand interaction platform provides, to the customer 108 via a computing device 110 (e.g., smartphone, personal computer, etc.), a graphical user interface (GUI) 106 through which the customer 108 may communicate with the brand interaction platform to submit its request. For instance, the customer 108 may utilize a computing device 110 to access a web portal or site provided by the brand interaction platform to access the GUI 106 to submit a request to the brand interaction platform for a particular issue or intent. As another example, the brand interaction platform may provide an application that may be installed on the computing device 110. This application may allow the customer 108 to access the brand interaction platform over a communications network (e.g., Internet). Further, the application may continuously communicate with the brand interaction platform to update the GUI 106 according to known intent terms and phrases, as described herein.

In an embodiment, the brand interaction platform, via an intent processing system 102, generates a graphical representation of intern terms and/or phrases associated with intents addressed by the intent processing system 102 over time. The intent processing system 102 may be implemented on a computing device of the brand interaction platform or as an application or executable code executed on a computing device of the brand interaction platform. The graphical representation of the intent terms and/or phrases may, in some instances, include a word cloud 104 mapped onto a graphical representation of a spherical object that may be manipulated via the GUI 106. For instance, the intent processing system 102 may identify intent terms and phrases associated with intents commonly submitted by customers of the brand over a period of time (e.g., daily, weekly, monthly, etc.). Alternatively, the intent processing system 102 may identify intent terms and phrases associated with historical intents or issues submitted by the customer 108 during previous interactions with the brand interaction platform. For instance, as a customer 108 communicates with an agent 116 associated with the brand interaction platform, the intent processing system 102 may assess any messages exchanged between the customer 108 and the agent 116 to identify one or more intents. Examples of intents can include (for example) topic, sentiment, complexity, and urgency. A topic can include, but is not limited to, a subject, a product, a service, a technical issue, a use question, a complaint, a refund request or a purchase request, etc. An intent can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some embodiments, the assessment of a message is performed using artificial intelligence or machine learning model configured to conduct a semantic analysis of the message and determine the intent. The semantic meaning for a particular class can be defined using a training data set and the machine learning model. To perform this classification based upon semantic similarity, the message may be encoded using an encoder model that is trained on data that converts the natural language into a vector representation. A convolutional neural network may be used to classify the vectors into different semantic classes. In some embodiments, the message is passed through a keyword matching system to determine whether any of the words in the message correspond to operative words. If no operative words are detected, the message may be processed using the artificial intelligence or the machine learning model to identify the operative words. In some instances, an intent may be identified by engaging a customer in a conversation that can include clarifying questions or requesting additional information.

In some embodiments, the assessment of the message is performed using artificial intelligence or machine learning model configured to conduct a semantic analysis of the message and determine the intent. The semantic meaning for a particular class can be defined using a training data set and the machine learning model. To perform this classification based upon semantic similarity, the message may be encoded using an encoder model that is trained on data that converts the natural language into a vector representation. A convolutional neural network may be used to classify the vectors into different semantic classes. In some embodiments, the message is passed through a keyword matching system to determine whether any of the words in the message correspond to operative words. If no operative words are detected, the message may be processed using the artificial intelligence or the machine learning model to identify the operative words.

In an embodiment, the intent processing system 102 performs an analysis of previously identified intents for customers of the brand to determine the frequency in which the identified intents have been detected over a period of time. For instance, the intent processing system 102 may aggregate all intents detected or otherwise processed over a pre-defined period of time (e.g., daily, weekly, monthly, etc.) for myriad customers of the brand and perform a statistical analysis of the aggregated intents to determine the popularity or frequency of each intent over the pre-defined period of time. For example, for a particular intent, the intent processing system 102 may determine the number of times the intent was detected over the pre-defined period of time. Using this number, the intent processing system 102 may determine a percentage corresponding to the frequency at which the intent was detected compared to other intents. As an illustrative example, if a particular intent was detected twenty times over a pre-defined period of time and, during this same period of time, the intent processing system 102 detected one hundred total intents (including the particular intent), the frequency for the particular intent may be 20%.

In an embodiment, the intent terms and/or phrases presented via the word cloud 104 mapped onto a graphical representation of a spherical object are sized based on the frequency of detection of the intent terms and/or phrases over the pre-defined period of time. For example, a particular intent term or phrase that is frequently encountered by the intent processing system 102 over the pre-defined period of time may be represented using a large font within the word cloud 104. Alternatively, a particular intent term or phrase that was infrequently encountered by the intent processing system 102 over the pre-defined period of time may be represented using a smaller font compared to the fonts used for other, more frequently detected intent terms and/or phrases. This may allow a customer 108 to more easily identify common intent terms and/or phrases that may be of interest to the customer 108 and that may be associated with the customer's actual issue. It should be noted that while spherical objects are used extensively throughout the present disclosure for the purpose of illustration, the word cloud 104 may be mapped onto graphical representations of other three-dimensional objects (e.g., cubic or rectangular prism objects, n-side three-dimensional objects, cylindrical objects, etc.).

As noted above, the intent processing system 102 may identify intent terms and phrases associated with intents commonly submitted by customers of the brand over a period of time or associated with historical intents or issues submitted by the customer 108 during previous interactions with the brand interaction platform. The intent processing system 102 may, thus, generate the word cloud 104 based on the frequency of intent terms and/or phrases corresponding to intents of a customer base of the brand or to intents of the customer 108 itself. For instance, a customer 108 interacting with the GUI 106 may be presented with a word cloud 104 corresponding to intent terms and/or phrases sized according to the frequency in which these terms and/or phrases were detected by the intent processing system 102 for myriad customers over a pre-defined period of time. Alternatively, the word cloud 104 may correspond to intent terms and/or phrases sized according to the frequency in which these terms and/or phrases were detected by the intent processing system 102 for the customer 108 over the pre-defined period of time. It should be noted that the pre-defined period of time may differ based on the population for which intents are analyzed (e.g., customer 108 versus pool of customers, etc.).

In an embodiment, the intent processing system 102 implements a machine learning algorithm or artificial intelligence that utilizes historical conversation data for the customer 108 and other customers associated with the brand as input to identify relationships between different intern terms and/or phrases for various intents. The machine learning algorithm or artificial intelligence may be trained using unsupervised training techniques. For instance, a dataset of input messages and corresponding intents may be analyzed using a clustering algorithm to identify correlations between different types of intent terms and/or phrases with different intents or intent types. Example clustering algorithms that may be trained using sample member attributes and representative attributes (e.g., historical data, hypothetical data, etc.) to identify potential pairings may include a k-means clustering algorithms, fuzzy c-means (FCM) algorithms, expectation-maximization (EM) algorithms, hierarchical clustering algorithms, density-based spatial clustering of applications with noise (DB SCAN) algorithms, and the like. Based on the output of the machine learning algorithm or artificial intelligence generated using the dataset of input messages and corresponding intents, the intent processing system 102 may classify certain intent terms and/or phrases as being associated with particular intents. Thus, each known intent may be associated with a variety of intent terms and/or phrases that are commonly used by customers of the brand in messages exchanged with agents 116 and/or other services 112 when expressing an issue or intent that they would like addressed.

In an embodiment, when a customer 108 accesses the GUI 106 to initiate a conversation with the intent processing system 102, the intent processing system 102 presents a word cloud 104 corresponding to a top-level cluster of the most popular intent terms and/or phrases associated with frequently encountered intents (e.g., from either the customer 108 or from a pool of customers associated with the brand). Using a cursor or other interaction element (e.g., a finger for touchscreen display elements, etc.), a customer 108 may select an intent term and/or phrase from the word cloud 104 to provide an initial indication of the issue or intent the customer 108 wishes to have addressed. As noted above, the word cloud 104 may be mapped onto a graphical representation of a spherical object that may be manipulated via the GUI 106. Accordingly, the customer 108, via the computing device 110, may interact with the graphical representation of the spherical object to rotate the word cloud 104 and more easily view and select the desired intent term or phrase from the interface 106.

In an embodiment, the intent processing system 102 provides, via the interface 106, a dialog field 118 through which the customer 108 may submit messages or queries to the intent processing system 102 for a particular issue or intent. If the customer 108 enters a string of text into the dialog field 118, the intent processing system 102 may evaluate the string of text to identify any intent terms and/or phrases associated with known intents. For instance, in an embodiment, the intent processing system 102 can process a new string of text using Natural Language Processing (NLP) to identify any intent terms and/or phrases expressed by the customer 108 via the dialog field 118. In some instances, the intent processing system 102 may utilize a keyword search for each term expressed in a new string of text inputted into the dialog field 118 to identify any intent terms and/or phrases expressed by the customer 108. It should be noted that the customer 108 may convey, to the intent processing system 102, a message using additional and/or alternative communication methods. For instance, the customer 108 may provide an audio recording expressing an issue or intent that it would like to have addressed by an agent or other service associated with the brand. Accordingly, the intent processing system 102 may process the audio recording using NLP or other artificial intelligence to identify any intent terms and/or phrases associated with an intent.

In an embodiment, when a customer 108 selects an intent term or phrase from the word cloud 104, the intent processing system 102 updates the word cloud 104 to present a new cluster of intent terms and/or phrases that may belong to the same cluster as the selected intent term or phrase. For instance, based on the intent term or phrase selected by the customer 108 from the word cloud 104, the intent processing system 102 may query the clustering algorithm or other artificial intelligence to identify the cluster or classification of the selected intent term or phrase. Once the intent processing system 102 identifies the cluster or class that the selected intent term or phrase corresponds to, to the intent processing system 102 may identify the other intent terms and/or phrases corresponding to this cluster or class. The intent processing system 102 may update the word cloud 104 to remove any intent terms and/or phrases that are not associated with the cluster or class. Further, the intent processing system 102 may update the word cloud 104 to present those intent terms and/or phrases associated with the cluster or class of the originally selected intent term or phrase.

If the customer 108, instead of selecting an intent term or phrase from the word cloud 104, opts to enter a string of text in the dialog field 118 or otherwise transmits one or more messages to the intent processing system 102 via the GUI 106, the intent processing system 102 may automatically, and in real-time, update the word cloud 104 according to any intent terms and/or phrases detected from the customer's string of text or one or more messages. As an illustrative example, if the customer 108 submits the string of text "Hi, I need to make a payment," the intent processing system 102 may detect the intent phrase "make a payment" from the string of text. The detection of the intent phrase "make a payment" may cause the intent processing system 102 to identify a cluster of intent terms and phrases corresponding to an intent associated with payments. Based on the intent terms and phrases within this cluster, the intent processing system 102 may automatically, and in real-time, update the word cloud 104 to present these intent terms and phrases. In some instances, the intent processing system 102 may dynamically update the word cloud 104 as the customer 108 enters a string of text into the dialog field 118. For instance, the intent processing system 102 may, in real-time, evaluate a string of text as it is being submitted to via the dialog field 118. Thus, the word cloud 104 may be continuously updated as the intent processing system 102 processes, in real-time, the string of text as it is being submitted.

In an embodiment, the intent processing system 102 continues to update the word cloud 104 according to the intent terms and/or phrases selected by the customer 108 until an intent term or phrase is selected that corresponds to an action performable by the intent processing system 102. For instance, if the customer 108 selects, from the word cloud 104, an intent term or phrase corresponding to a method of payment (e.g., "credit card," "Apple Pay®", "by check," etc.), the intent processing system 102 may cause the computing device 110 to present, to the customer 108, a payment authorization screen to submit payment to the brand. Alternatively, the intent processing system 102 may redirect the customer 108 to a payment processing service, through which the customer 108 may submit payment using the selected payment method. As yet another example, the intent processing system 102 may assign an agent 116 to the customer 108, which may communicate with the customer 108 to process the payment.

In some instances, if the intent processing system 102 identifies, based on the customer's selection of intent terms and/or phrases via the GUI 106, an intent, the intent processing system 102 can determine to which endpoint communication is to be routed. For instance, if the customer 108, via the computing device 110, has previously communicated with a given agent 116, communication routing can be generally biased towards the same agent 116. Other factors that may influence routing once an intent has been identified based on customer interaction with the GUI 106 and selection of intent terms and/or phrases can include, for example, an inferred or identified customer or agent sentiment pertaining to the previous communication; a topic of a present communication (e.g., and an extent to which that relates to a topic of a previous communication and/or a knowledge base associated with one or more agents 116); whether the agent 116 is available; and/or a predicted response latency of the computing device 114 utilized by the agent 116. Such factors may be considered absolutely or relative to similar metrics corresponding to other agents 116. A re-routing rule (e.g., a client-specific or general rule) can indicate how such factors are to be assessed and weighted to determine whether to forego agent consistency.

When a computing device 110 (or other computing device associated with a same customer 108 or account) has not previously communicated with a given computing device 114 associated with an agent 116 (e.g., about matters relating to a client), an agent selection can be performed based on factors such as, for example, an extent to which various agents' knowledge base corresponds to a communication topic, availability of various agents 116 at a given time and/or over a channel type, types and/or capabilities of agents 116, a language match between a customer 108 and agents 116, and/or a personality analyses. In one instance, a rule can identify how to determine a sub-score to one or more factors such as these and a weight to assign to each score. By combining (e.g., summing) weighted sub-scores, a score for each agent 116 can be determined. An agent selection can then be made by comparing agents' scores (e.g., to select a high or highest score).

If the intent processing system 102 determines, based on the identified intent, that another service 112 may provide resolution for the intent, the intent processing system 102 may route communications from the customer 108 to an endpoint corresponding to the other service 112. For example, if the intent corresponds to arranging a payment for a phone bill issued by a wireless carrier service, the intent processing system 102 may route the customer 108 to the wireless carrier service to allow the customer 108, via the computing device 110, to make a payment for the existing phone bill.

In some instances, the intent processing system 102 can monitor communications between the customer 108 and an agent 116 or other service 112 to determine a customer sentiment with regard to the identification of the customer's intent based on the customer's selections of intent terms and/or phrases from the word cloud 104 and to the routing of communications based on the identification of the customer's intent. For instance, if the customer 108 expresses in a communication that the intent processing system 102 has selected an undesirable action based on the intent terms and/or phrases selected by the customer 108, the intent processing system 102 may utilize this feedback to retrain the clustering algorithm or artificial intelligence used to associate intent terms and/or phrases with particular intents to more accurately associate the customer's selections with the appropriate intent. As another example, as the customer 108 navigates the word cloud 104 to select intent terms and/or phrases for its intent, if the customer 108 determines that the intent terms and/or phrases within a particular word cloud 104 are unrelated or irrelevant to the customer's intent, the intent processing system 102 may retrain the clustering algorithm or artificial intelligence to more accurately associate the previously selected intent term, intent phrase, or customer communication entered into the dialog field 118 with the appropriate cluster corresponding to the customer's actual intent. For instance, if the customer 108 selects the intent phrase "payment plan" and the intent processing system 102 updates the word cloud 104 to present intent terms and/or phrases associated with an intent corresponding to making a payment for a bill, the customer may indicate that these intent terms and/or phrases are not related to the creation of a payment plan. This may cause the intent processing system 102 to update the clustering algorithm or artificial intelligence to more accurately associate the phrase "payment plan" with other intent terms and/or phrases associated with an intent corresponding to the creation or management of a payment plan.

Figure 2:
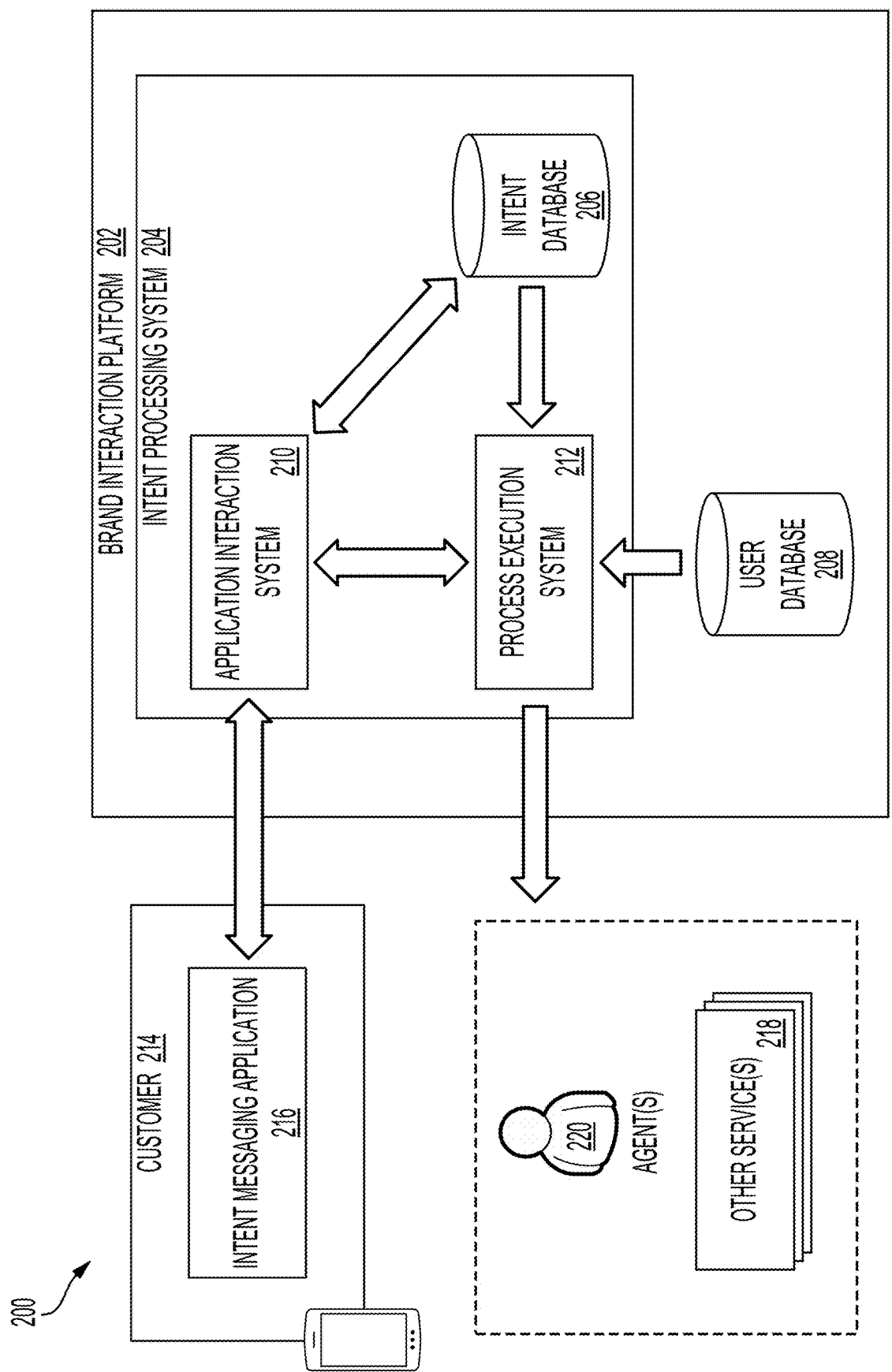
FIG. 2 shows an illustrative example of an environment in which an intent processing system of a brand interaction platform provides a graphical representation of intent clusters via an interface through which actions may be identified based on customer selection of intent terms via the interface in accordance with at least on embodiment.

FIG. 2 shows an illustrative example of an environment 200 in which an intent processing system 204 of a brand interaction platform 202 provides a graphical representation of intent clusters via an interface through which actions may be identified based on customer selection of intent terms via the interface in accordance with at least on embodiment. In the environment 200, a customer 214 may access the brand interaction platform 202 via an intent messaging application 216. The intent messaging application 216 may be provided by the brand interaction platform 202 and executed on a customer's computing device, such as a smartphone, tablet computer, personal computer, and the like. In some instances, the customer 214 may access the brand interaction platform 202 via a web site or web portal using a browser application installed on the customer's computing device.

In an embodiment, the intent messaging application 216 communicates with an application interaction system 210 of the intent processing system 204 to identify and present a top-level cluster of intent terms and/or phrases that may be used by the customer 214 to begin defining an intent. The application interaction system 210 may implemented on a computing device of the intent processing system 204 or as an application or executable code executed on a computing device of the brand interaction platform 202. The application interaction system 210 may access an intent database 206 maintained by the intent processing system 204 to identify the intent terms and/or phrases that may form the top-level cluster of intent terms and/or phrases that may be presented to the customer 214 via the intent messaging application 216. The intent database 206 may include entries corresponding to known intent terms and phrases that are associated with different intents. Further, an entry corresponding to a known intent term or phrase may indicate a relationship between the intent term/phrase with other intent terms or phrases (e.g., a cluster of terms or phrases associated with known intents). As noted above, the intent processing system 204 may utilize a clustering algorithm or artificial intelligence to identify relationships between different intern terms and/or phrases for various intents. These relationships, via the various intent term or phrase entries, may be recorded in the intent database 206.

The application interaction system 210 may generate, via a GUI of the intent messaging application 216, a word cloud that includes the intent terms and phrases corresponding to the identified top-level cluster. As noted above, the word cloud may be mapped onto a graphical representation of a spherical object that may be manipulated via the GUI of the intent messaging application 216. For instance, using a cursor or other interaction element (e.g., a finger or stylus for touchscreen display elements, etc.), a customer 214 may manipulate the graphical representation of the spherical object (e.g., rotate along various axes, etc.) to evaluate the different intent terms and/or phrases of the top-level cluster. Through the word cloud, the customer 214 may select a particular intent term or phrase that may be used to begin identification of the customer's intent.

In an embodiment, if the customer 214 selects an intent term or phrase from the word cloud, the application interaction system 210 utilizes the selected intent term or phrase to identify a corresponding intent cluster from the intent database 206. As noted above, an intent cluster may include a set of intent terms and/or phrases that may be associated with a particular intent and corresponding actions. Further, an intent cluster may define relationships amongst different intent terms and phrases. For example, the intent phrase "make some payment arrangements" may be associated with payment-specific intent phrases, such as "3@$40," "5@$24," whereby these intent phrases may correspond to the number of payments to be made and the amount for each of these payments. Further, the intent phrase "make some payment arrangements" may be associated with other intent terms and phrases, such as "pay bill," "credit card," "Apple Pay®," and the like. The application interaction system 210 may update the word cloud to present the intent cluster corresponding to the initial intent term or phrase selected from the top-level cluster.

In an embodiment, in response to the customer's selection of an intent term or phrase from the word cloud, the application interaction system 210 submits the selected intent term or phrase to a process execution system 212 to identify customer-specific intent terms or phrases that may be presented to the customer 214 for further definition of the customer's intent. The process execution system 212 may be implemented on a computing device of the intent processing system 204 or as an application or executable code executed on a computing device of the brand interaction platform 202. Using the illustrative example above, if the customer 214 selects the intent phrase "make some payment arrangements," the process execution system 212 may access a user database 208 to access the customer's account and identify any outstanding accounts that the customer 214 may have with the brand or other services 218 associated with the brand. For instance, if the process execution system 212 determines, based on the customer's account in the user database 208, that the customer 214 has an outstanding balance of $120 and that the customer 214 has selected the intent phrase "make some payment arrangements," the process execution system 212 may generate payment-specific intent phrases, such as "3@$40," "5@$24," and the like.

In some instances, the process execution system 212 may access the intent database 206 to identify sample intent terms or phrases that may be used to create customer-specific intent terms or phrases. For example, an intent cluster corresponding to an intent for making payments on an account may include a sample intent phrase such as "X@$YY," where "X" may denote the number of payments and "YY" may denote a monetary value for each payment. Based on the intent term or phrase selected by the customer 214 from the top-level cluster, the process execution system 212 may identify a sample intent phrase and utilize information from the user database 208 to personalize the new intent phrase or term. As an illustrative example, if the customer 214 has selected the intent phrase "make some payment arrangements," and the process execution system 212 identifies, from a corresponding intent cluster, the sample intent phrase "X@$YY," the process execution system 212 may determine, based on the customer's account from the user database 208, the different payment terms that may be offered to the customer 214. Based on these different payment terms, the process execution system 212 may modify the sample intent phrase to define one or more personalized payment arrangements for the customer 214. For instance, if the customer 214 has an outstanding balance of $120 and the customer 214 is approved to divide this outstanding balance over 4-5 payments, the process execution system 212 may modify the sample intent phrase "X@$YY" to generate the personalized intent phrases "4@$30" and "5@$24." The process execution system 212 may associate these personalized intent phrases with the sample intent phrase and the corresponding intent cluster such that customer selection of any personalized intent phrase may be used to identify corresponding intent terms/phrases and/or actions that may be performed according to the intent.

In an embodiment, the application interaction system 210, via the GUI presented to the customer 214 via the intent messaging application 216, can highlight any specific intent terms and/or phrases from an intent cluster that are related to the previously selected intent term or phrase. For example, if the customer 214 selects the intent phrase "make some payment arrangements" from the top-level cluster presented in the word cloud, the application interaction system 210 may update the word cloud to present the myriad intent terms and/or phrases that are in the same intent cluster as the selected intent phrase. Further, the application interaction system 210 may determine, from the intent database 206, which intent terms and/or phrases are directly related to the selected intent term or phrase. For example, the intent phrase "make some payment arrangements" may be directly related to the intent phrases "pay bill," "3@40," "1@$120," and the like. The application interaction system 210 may update the word cloud presented via the GUI to highlight these directly related intent phrases to enable the customer 214 to immediately identify related intent phrases that may correspond to the customer's intent. Highlighting intent terms or phrases may include (but not limited to) using an alternative font color, using an alternative font, using an alternative font size, applying a shape around the related intent terms or phrases, and the like. In some instances, directly related intent terms or phrases may be determined based on the frequency in which these intent terms or phrases are used in conjunction with the previously selected intent term or phrase.

As the customer 214 continues to select intent terms and/or phrases from the word cloud, the application interaction system 210 may transmit a string of the selected intent terms and/or phrases to the process execution system 212 to determine whether the string of the selected intent terms and/or phrases define a particular customer intent for which one or more actions may be performed to address the intent. For example, if the customer 214 selects the intent phrases "make some payment arrangements," "5@$24," and "Apple Pay®," the process execution system 212 may determine that the customer 214 wishes to pay an initial payment of $24 using Apple Pay® for a particular account. Further, the process execution system 212 may determine that the customer 214 wishes to make five payments to the account over a period of time (e.g., monthly payments, etc.). Accordingly, the process execution system 212 may update the customer's account in the user database 208 to define a payment schedule for the customer 214 according to the selected terms and transmit a notification to the application interaction system 210 to transmit billing information to Apple Pay® on the customer's computing device to obtain an initial payment. The customer 214 may be provided with information related to the payment via Apple Pay®, through which the customer 214 may approve the payment.

In some instances, if the process execution system 212 determines that the identified intent may be resolved by another service 218 or an agent 220, the process execution system 212 may redirect the customer 214 to the other service 218 or agent 220 according to the identified intent. As noted above, the intent processing system 204 can determine to which endpoint communication is to be routed. For instance, if the customer 214 has previously communicated with a given agent 220, communication routing can be generally biased towards the same agent 220. Other factors that may influence routing once an intent has been identified can include, for example, an inferred or identified customer or agent sentiment pertaining to the previous communication; a topic of a present communication (e.g., and an extent to which that relates to a topic of a previous communication and/or a knowledge base associated with one or more agents 220); whether the agent 220 is available; and/or a predicted response latency of the computing device utilized by the agent 220. Such factors may be considered absolutely or relative to similar metrics corresponding to other agents 220. A re-routing rule (e.g., a client-specific or general rule) can indicate how such factors are to be assessed and weighted to determine whether to forego agent consistency.

If the process execution system 212 determines, based on the identified intent, that another service 218 may provide resolution for the intent, the process execution system 212 may route communications from the customer 214 to an endpoint corresponding to the other service 218. For example, if the intent corresponds to arranging a payment for a phone bill issued by a wireless carrier service, the process execution system 212 may route the customer 214 to the wireless carrier service to allow the customer 214 to make a payment for the existing phone bill. The process execution system 212 may route communications to the endpoint corresponding to the other service 218 via the intent messaging application 216. This may allow the customer 214 to communicate with the other service 218 using the intent messaging application 216.

In an embodiment, as an alternative to providing a graphical representation of a word cloud that includes popular intent terms or phrases, the intent messaging application 216 can provide a dialog field or other messaging option through which the customer 214 may communicate with the intent processing system 204. As the customer 214 enters a message into the dialog field via the intent messaging application 216, the application interaction system 210 can process, dynamically and in real-time, the message as it is being entered to identify any intent terms or phrases used by the customer 214. For instance, the application interaction system 210 may query the intent database 206 using the terms in the message to determine whether any of these terms correspond to an intent term or phrase stored in the intent database 206. In some instances, the application interaction system 210 may use NLP or artificial intelligence to process the message and identify any intent terms or phrases within the message.

If the application interaction system 210 identifies an intent term or phrase within the provided message, the application interaction system 210 may pass the message and the identified intent term or phrase to a process execution system 212 of the intent processing system 204 to determine a subsequent action. In an embodiment, the process execution system 212 utilizes a machine learning algorithm or artificial intelligence to identify an appropriate action to be performed and/or response to be provided to the customer 214 based on the provided message and identified intent term or phrase identified by the application interaction system 210. The machine learning algorithm or artificial intelligence may be trained using supervised training techniques. For instance, a dataset of input messages, corresponding intent terms and/or phrases, and known relevant responses to these intent terms and/or phrases can be selected for training of the machine learning model. In some implementations, the machine learning model may be evaluated to determine, based on the input sample messages and corresponding intent terms and/or phrases supplied to the machine learning model, whether the machine learning model is identifying appropriate responses to each of these messages according to the intent terms and/or phrases from the input sample messages. Based on this evaluation, the machine learning model may be modified to increase the likelihood of the machine learning model generating the desired results (e.g., follow-up responses to solicit additional messages used to identify additional intent terms and/or phrases or to identify appropriate actions). The machine learning model may further be dynamically trained by soliciting feedback from customers, including customer 214, with regard to the identification of intent terms and/or phrases from its messages and to responses provided in response to messages submitted by the customer 214.

As an illustrative example, as a customer 214 inputs, into a dialog field "Hi, I would like to make some payment arrangements," the application interaction system 210 may detect the intent phrase, "make some payment arrangements," and highlight this phrase within the dialog field. If the customer 214 selects this intent phrase, the application interaction system 210 may provide the inputted message and the selected intent phrase to the process execution system 212, which may use the message and the selected intent phrase as input to the machine learning algorithm to determine how to proceed. The machine learning algorithm may indicate, as output, the response, "Sure, how many payments?" to solicit, from the customer 214, an indication of the number of payments to be made. If the customer 214 responds with a numerical value, the application interaction system 210 may highlight this numerical value and allow the customer 214 to indicate that this is the number of payments that the customer 214 would like to make over time. Thus, the application interaction system 210 may evaluate the customer's response in the context of the query submitted by the process execution system 212. In some instances, the application interaction system 210 may utilize NLP or artificial intelligence to process exchanged messages between the customer 214 and the process execution system 212 to contextualize these messages and identify intent terms/phrases and additional responses that may be used to identify an action that may be performed.

Based on the intent terms/phrases identified from the customer's messages and the responses submitted to the queries submitted by the process execution system 212, the process execution system 212 may determine whether an action may be performed. Returning to the illustrative example above, once the customer 214 has indicated the number of payment that they would like to make, the process execution system 212 may provide a response, "Ok. How would you like to pay?" to solicit a further response from the customer 214. Further, the process execution system 212 may provide one or more possible actions that the customer 214 may select from for submission of a payment (e.g., Credit Card, Apple Pay®, or Check). If the customer 214 selects one of these possible actions, the process execution system 212 may perform one or more actions to facilitate payment according to the selected payment method. Thus, the process execution system 212 may utilize the messages submitted by the customer 214 and any identified intent terms and/or phrases to identify an actual intent and, based on the identified intent, determine what action(s) may be performed to address the actual intent.

In an embodiment, if the process execution system 212 directs a customer 214 to another service 218 or to an agent 220 based on the identified intent, the process execution system 212 can monitor communications between the customer 214 and an agent 220 or other service 218 to determine a customer sentiment with regard to the identification of the customer's intent and to the routing of communications based on the identification of the customer's intent. For instance, if the customer 214 expresses in a communication that the process execution system 212 has selected an undesirable action based on the intent terms and/or phrases selected by the customer 214, the intent processing system 204 may utilize this feedback to retrain the clustering algorithm or artificial intelligence used to associate intent terms and/or phrases with particular intents to more accurately associate the customer's selections with the appropriate intent. As another example, as the customer 214 navigates the word cloud to select intent terms and/or phrases for its intent, if the customer 214 determines that the intent terms and/or phrases within a particular word cloud are unrelated or irrelevant to the customer's intent, the intent processing system 204 may retrain the clustering algorithm or artificial intelligence to more accurately associate the previously selected intent term, intent phrase, or customer communication provided via the intent messaging application 216 with the appropriate cluster corresponding to the customer's actual intent.

Figure 3:
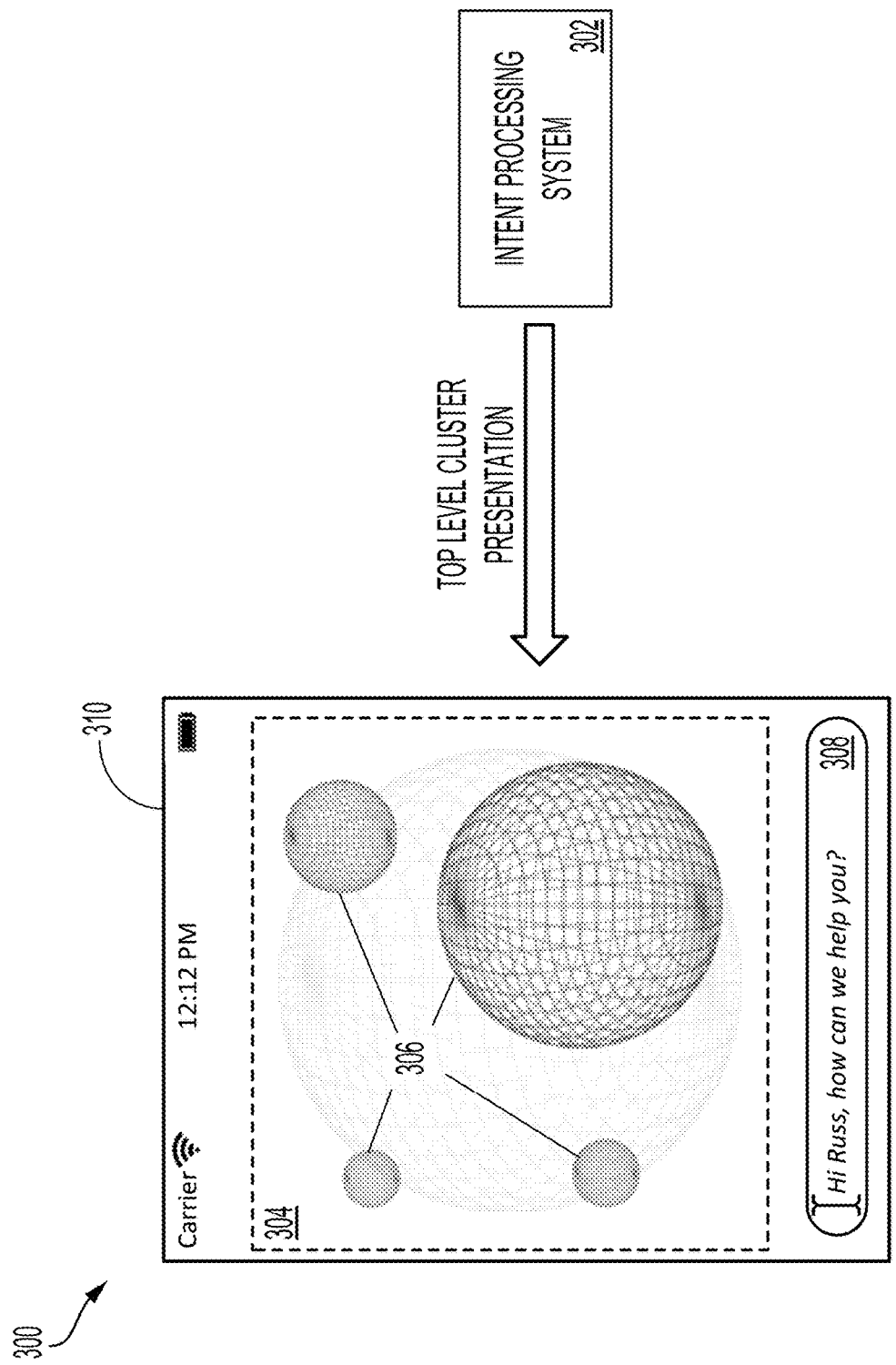
FIG. 3 shows an illustrative example of an environment in which an intent processing system generates and presents various intent clusters based on intent term similarities and frequency of usage in accordance with at least one embodiment.

FIG. 3 shows an illustrative example of an environment 300 in which an intent processing system 302 generates and presents various intent clusters based on intent term similarities and frequency of usage in accordance with at least one embodiment. In the environment 300, a customer may access an intent processing system 302 of a brand interaction platform to initiate a conversation with the intent processing system 302 for a particular intent or issue. For instance, a customer may access the intent processing system 302 to provide payment for an existing service. As another example, a customer may access the intent processing system 302 to indicate an issue with a particular item purchased from the brand that the customer would like to have addressed.

As noted above, the intent processing system 302 may provide a GUI 310, through which the customer may be presented with one or more word clouds 304 mapped onto graphical representations of spherical objects 306 that may be manipulated via the GUI 310. Each spherical object 306 presented via the GUI 310 may correspond to a cluster of intent terms and/or phrases associated with a particular intent. In some instances, the intent processing system 302, via the GUI 310, may present a master spherical object corresponding to a top-level cluster of intent terms and/or phrases and one or more sub-level spherical objects corresponding to lower level clusters of intent terms and/or phrases. For example, as noted above, the master spherical object corresponding to the top-level cluster may include the most popular intent terms and/or phrases associated with frequently encountered intents (e.g., from either the customer or from a pool of customers associated with the brand). The one or more sub-level spherical objects may correspond to intent terms and/or phrases associated with specific intents. The size of each of the one or more sub-level spherical objects may correspond with the frequency in which the associated intents are detected by the intent processing system 302 over a period of time (e.g., weekly, monthly, etc.).

In an embodiment, the size of each of the graphical representations of spherical objects 306 is proportional to how close the spherical object is to the front of the customer's computing device and to the strike zones of the GUI 310. For instance, a graphical representation of a spherical object 306 may have a greater size within a primary strike zone of the GUI 310 (e.g., portion of the GUI 310 where customer interaction is greatest), whereas a graphical representation of a spherical object 306 may have a smaller size within a secondary strike zone of the GUI 310 (e.g., portion of the GUI 310 where customer interaction is intermitted or not as frequent as the primary strike zone). As the spherical objects drift from the primary and secondary strike zones of the GUI 310, the size of these spherical objects may continue to decrease until a minimum size threshold is reached.

In an embodiment, rather than presenting a master spherical object corresponding to a top-level cluster of intent terms and/or phrases and one or more sub-level spherical objects corresponding to lower level clusters of intent terms and/or phrases, the graphical representation of spherical objects 306 presented via the GUI 310 may correspond to the top-level clusters corresponding to the most popular intents detected by the intent processing system 302 from communications between customers and agents or other services. In an embodiment, the intent processing system 302 can use one or more clustering algorithms or artificial intelligence to define the number of top-level clusters to be graphically represented within the GUI 310 using spherical objects 306. For instance, the intent processing system 302 may utilize a combination of term frequency—inverse document frequency (TFIDF), singular value decomposition (SVD), and a K-means clustering algorithm with labels to define the number of top-level clusters. As noted above, the intent processing system 302 performs an analysis of previously identified intents for customers of the brand to determine the frequency in which the identified intents have been detected over a period of time. The intent processing system 302 may aggregate all intents detected or otherwise processed over a pre-defined period of time (e.g., daily, weekly, monthly, etc.) for myriad customers of the brand and perform a statistical analysis of the aggregated intents to determine the popularity or frequency of each intent over the pre-defined period of time. For example, for a particular intent, the intent processing system 102 may determine the number of times the intent was detected over the pre-defined period of time. Using this number, the intent processing system 302 may identify the more popular or frequent intents that may be used to define the top-level clusters to be presented via the GUI 310.

In an embodiment, the intent processing system 302, for each top-level cluster, can determine the density of intent terms and/or phrases that are to be presented in a word cloud corresponding to the top-level cluster. The density of a top-level cluster may be driven by the similarity of intent terms and/or phrases inputted by a customer in comparison to the other top-level clusters. The intent processing system 302 may utilize a clustering algorithm or artificial intelligence to determine the density of a particular top-level cluster. For instance, the intent processing system 302 may use a combination of TFIDF, SVD, and a K-means clustering algorithm to identify the intent terms and/or phrases for a top-level cluster. The intent processing system 302 may then calculate the difference of the identified intent terms and/or phrases in relation to other intent terms and/or phrases for other top-level clusters. This may result in a difference score. The density of a top-level cluster may be determined based on the difference score. For instance, if the difference score is large, the top-level cluster may have a high density (e.g., include a large number of intent terms and/or phrases). Conversely, if the difference score is low, the top-level cluster may have a lower density (e.g., include a fewer number of intent terms and/or phrases).

In some instances, the intent processing system 302 may configure each graphical representation of a spherical object 306 within the GUI 310 to rotate on along an individual axis automatically. Further, the spherical objects 306 may be configured to behave in a fashion similar to that of a solar system, whereby the spherical objects 306 may rotate along a central axis, serving as satellites around an invisible spherical object. As the spherical objects 306 rotate along this central axis, the size of each spherical object 306 may automatically and dynamically change based on its proximity to the front of the computing device and the primary and secondary strike zones described above.

In an embodiment, the intent processing system 302 can dynamically, and in real-time, update the GUI 310 based on customer intent request spikes. For instance, as customers interact with the GUI 310 or otherwise communicate with the intent processing system 302 for different issues and intents, the intent processing system 302 may, in real-time, determine the frequency in which these issues and intents are detected. The intent processing system 302 may determine, based on this updated data, whether a change to the top-level clusters presented via the GUI 310 is required. For example, if a particular intent is being detected at a greater rate over a short period of time (e.g., a spike), the intent processing system 302 may update, in real-time, the GUI 310 to present a top-level cluster corresponding to this particular intent. The intent processing system 302, in some instances, may also remove the least frequent intent cluster from the GUI 310 to accommodate the intent cluster corresponding to the particular intent. Thus, at any given time, the GUI 310 may present the top-level clusters corresponding to intents having the highest volume at the given time.

It should be noted that the intent clusters presented using graphical representations of spherical objects 306 via the GUI 310 may be determined based factors or criteria other than historical frequency or volume. For instance, a brand may define which clusters are presented based on particular interests. As an illustrative example, if a brand wishes to promote a particular product or service, the brand may indicate, to the intent processing system 302, that a top-level cluster presented via the GUI 310 is to correspond to an intent related to the particular product or service. As another example, the intent processing system 302 may generate a top-level cluster for an intent as a result of a real-time spike in detection of the intent. For example, if the intent processing system 302 detects a spike for an intent related to flight cancellations due to a weather event, the intent processing system 302 may, dynamically and in real-time, define a top-level cluster related to the intent.

In an embodiment, the intent processing system 302 provides, via the GUI 310, a dialog field 308, through which a customer may input a text string to communicate its request, issue, or intent. As noted above, if a customer enters a string of text into the dialog field 308, the intent processing system 302 may evaluate the string of text to identify any intent terms and/or phrases associated with known intents. For instance, the intent processing system 302 may process a new string of text using NLP to identify any intent terms and/or phrases expressed by the customer via the dialog field 308. In some instances, the intent processing system 302 may utilize a keyword search for each term expressed in a new string of text inputted into the dialog field 308 to identify any intent terms and/or phrases expressed by the customer. Based on the identified intent terms and/or phrases, the intent processing system 302 may, dynamically and in real-time, manipulate the graphical representations of the spherical objects 306 corresponding to the top-level clusters to present the most likely intent match. For instance, the intent processing system 302 may orient the spherical objects 306 such that the spherical object corresponding to the top-level cluster associated with the identified intent terms and/or phrases is presented prominently within the primary strike zone of the GUI 310, resulting in the size of the spherical object being adjusted (e.g., increased) according to its position within the primary strike zone. Further, the intent processing system 302 may orient the spherical object such that the identified intent terms and/or phrases are presented closer to the front of the computing device. This may allow the customer to select the prominently displayed intent term or phrase from the top-level cluster and continue with submission of its issue or intent.

Figure 4:
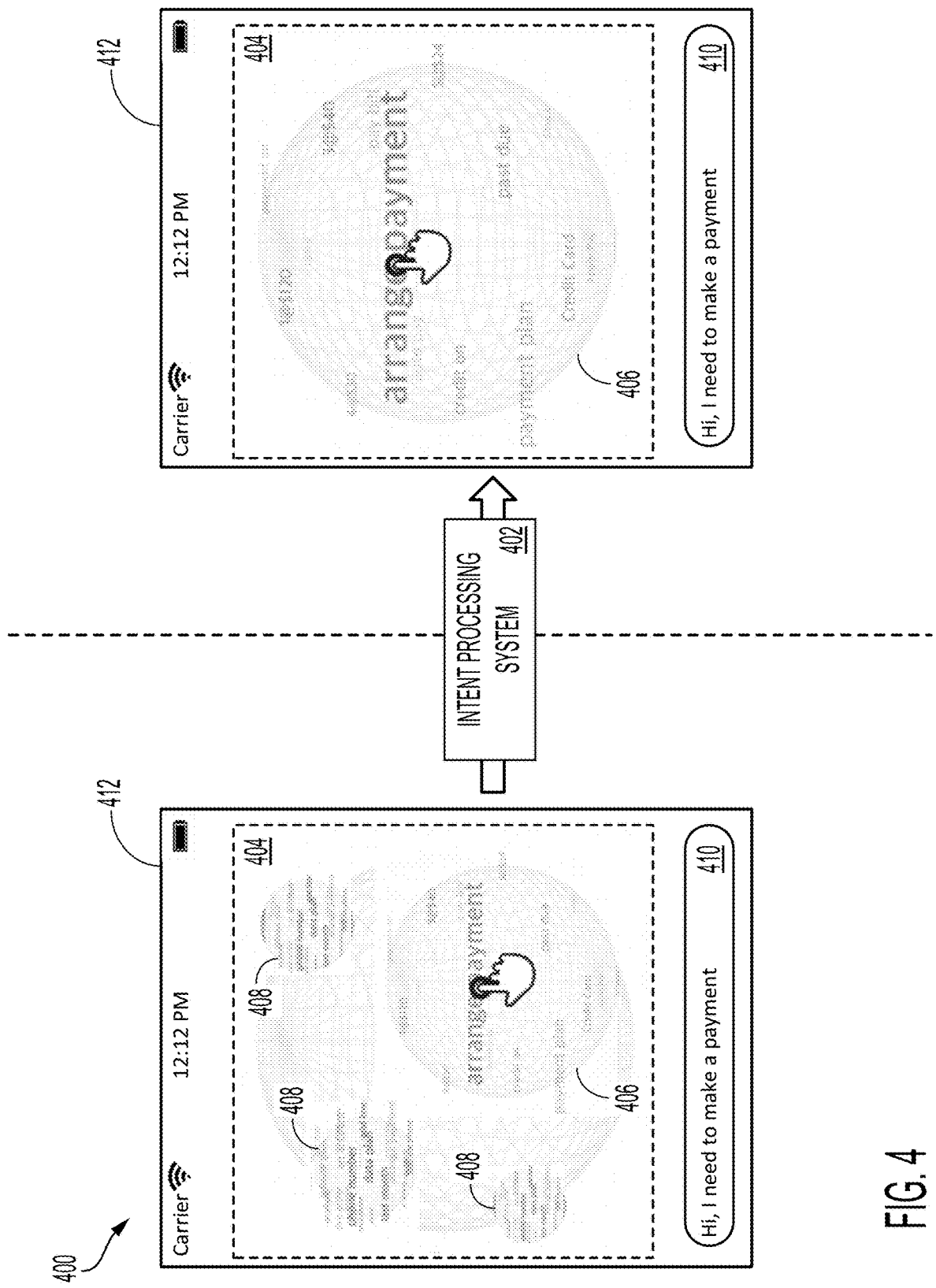
FIG. 4 shows an illustrative example of an environment in which an intent processing system updates an interface to focus on a top-level intent cluster based on customer selection of an intent term from the top-level intent cluster in accordance with at least one embodiment.

FIG. 4 shows an illustrative example of an environment in which an intent processing system 402 updates an interface 412 to focus on a top-level intent cluster based on customer selection of an intent term from the top-level intent cluster in accordance with at least one embodiment. In the environment 400, a customer may interact with a top-level cluster represented using a graphical representation of a spherical object 406 to select a particular intent term or phrase corresponding to the customer's issue or intent. For example, as illustrated in FIG. 4, a customer may utilize a cursor or other interaction element (e.g., a finger or stylus for touchscreen display elements, etc.) to select an intent term or phrase from a graphical representation of a spherical object 406 that represents a top-level cluster of intent terms and/or phrases for a particular intent.

As noted above, the intent processing system 402 may present, via the interface 412, a word cloud 404 comprising graphical representations of spherical objects 406, 408. Each of these graphical representations of spherical objects 406, 408 may correspond to a top-level cluster of intent terms and/or phrases associated with a particular intent. The graphical representations of spherical objects 406, 408 may be sized according to their proximity to primary and second strike zones of the interface 412 and to the front of the customer's computing device. For instance, as illustrated in FIG. 4, the graphical representation of the spherical object 406 may have a greater size compared to the graphical representations of the other spherical objects 408 as a result of the spherical object 406 being positioned within the primary strike zone and close to the front of the customer's computing device.

The intent processing system 402 may provide a dialog field 410, through which the customer may submit messages or queries to the intent processing system 402 for a particular issue or intent. If the customer enters a string of text into the dialog field 410, the intent processing system 402 may evaluate the string of text to identify any intent terms and/or phrases associated with known intents. As noted above, based on the identified intent terms and/or phrases, the intent processing system 402 may, dynamically and in real-time, manipulate the graphical representations of the spherical objects 406, 408 corresponding to the top-level clusters to present the most likely intent match. For instance, the intent processing system 402 may orient the spherical objects 406, 408 such that the spherical object 406 corresponding to the top-level cluster associated with the identified intent terms and/or phrases is presented prominently within the primary strike zone of the interface 412, resulting in the size of the spherical object 406 being adjusted (e.g., increased) according to its position within the primary strike zone. Further, the intent processing system 402 may orient the spherical object 406 such that the identified intent terms and/or phrases are presented closer to the front of the computing device.

In an embodiment, if the customer selects an intent term or phrase from a graphical representation of the spherical object 406 corresponding to a top-level cluster, the intent processing system 402 updates the interface 412 to only present the spherical object 406 corresponding to the top-level cluster within the word cloud 404. The intent processing system 402 may remove the graphical representations of the other spherical objects 408 to allow the customer to focus solely on the top-level cluster corresponding to the selected intern term or phrase. Further, the customer may view, via the interface 412, the other intent terms and/or phrases belonging to the top-level cluster, which may allow the customer to select other intent terms and/or phrases to further define its issue or intent.

In some instances, when the intent processing system 402 updates the interface 412 to present the spherical object 406 corresponding to the top-level cluster including the intent term or phrase selected by the customer, the intent processing system 402 may highlight any specific intent terms and/or phrases from the top-level cluster that are related to the previously selected intent term or phrase. For example, if the customer selects the intent phrase "arrange payment" from the top-level cluster presented in the word cloud 404, the intent processing system 402 may determine which intent terms and/or phrases are directly related to this intent phrase. For example, as illustrated in FIG. 4, the intent phrase "arrange payment" may be directly related to the intent phrases "payment plan," "pay bill," "3@$40," "1@$120," and the like. The intent processing system 402 may update the word cloud 404 presented via the interface 412 to highlight these directly related intent phrases to enable the customer to immediately identify related intent phrases that may correspond to the customer's intent. Highlighting intent terms or phrases may include (but not limited to) using an alternative font color, using an alternative font, using an alternative font size, applying a shape around the related intent terms or phrases, and the like.

Figure 5:
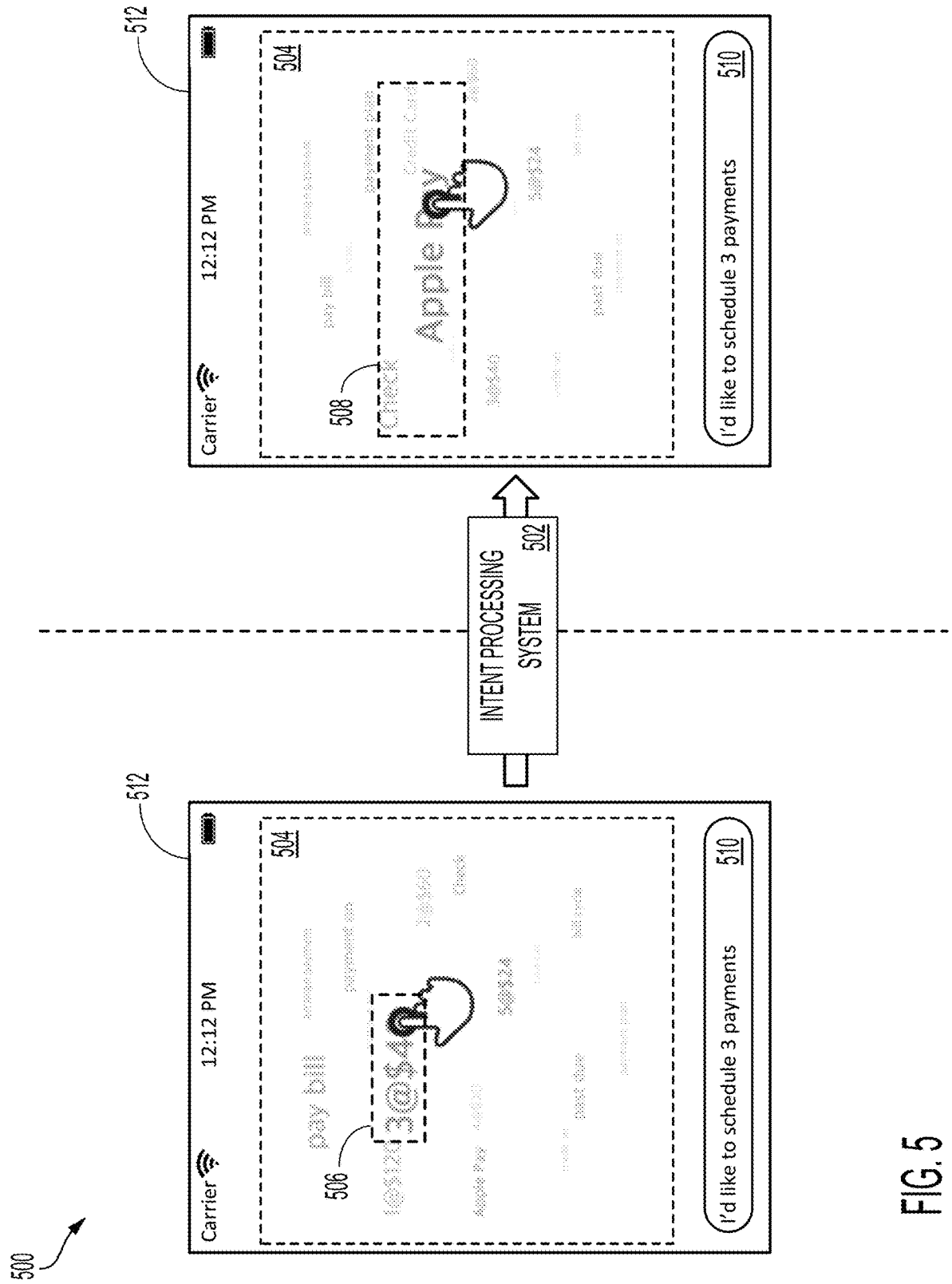
FIG. 5 shows an illustrative example of an environment in which an intent processing system updates an interface to present related intent terms from an intent cluster based on customer selection of a particular intent term from the intent cluster in accordance with at least one embodiment.

FIG. 5 shows an illustrative example of an environment 500 in which an intent processing system 502 updates an interface 512 to present related intent terms from an intent cluster based on customer selection of a particular intent term 508 from the intent cluster in accordance with at least one embodiment. In the environment 500, the intent processing system 502 may present an intent cluster corresponding to a particular intent within a word cloud 504 presented via the interface 512. The intent cluster may be a top-level cluster graphically represented onto a spherical object that may be manipulated via the interface 512. For instance, a customer may utilize a cursor or other interaction element (e.g., a finger or stylus for touchscreen display elements, etc.) to manipulate the spherical object corresponding to the intent cluster along one or more degrees of freedom. As the customer manipulates the spherical object via the interface 512, the intent processing system 502 may dynamically and in real-time modify the size of each of the intent terms and/or phrases of the intent cluster according to their relative position on the spherical object. This may allow the customer to manipulate the spherical object to access particular intent terms or phrases for selection.

The word cloud 504 illustrated in FIG. 5 may correspond to the spherical object 406 described above in connection with FIG. 4. For instance, the word cloud 504 may include a spherical object corresponding to a top-level cluster that includes intent terms and/or phrases associated with the customer's selection of the intent phrase "arrange payment." As illustrated in FIG. 5, the customer may select the intent phrase 506 ("3@$40") to indicate that the customer would like to create a payment plan whereby the customer may submit three payments of $40 for an outstanding balance. As noted above, the intent processing system 502 may identify sample intent terms or phrases that may be used to create customer-specific intent terms or phrases. For example, an intent cluster corresponding to an intent for making payments on an account may include a sample intent phrase such as "X@$YY," where "X" may denote the number of payments and "YY" may denote a monetary value for each payment. Based on the intent term or phrase selected by the customer from the top-level cluster (e.g., "arrange payments"), the intent processing system 502 may identify a sample intent phrase and personalize the new intent phrase or term according to information available about the customer.

As illustrated in FIG. 5, if the customer has selected the intent phrase "arrange payment," and the intent processing system 502 identifies, from a corresponding intent cluster, the sample intent phrase "X@$YY," the intent processing system 502 may determine, based on the customer's account, the different payment terms that may be offered to the customer. Based on these different payment terms, the intent processing system 502 may modify the sample intent phrase to define one or more personalized payment arrangements for the customer. For instance, and as illustrated in FIG. 5, if the customer 24 has an outstanding balance of $120 and the customer is approved to divide this outstanding balance over 1-5 payments, the intent processing system 502 may modify the sample intent phrase "X@$YY" to generate the personalized intent phrases "1@$120," "2@$60," "3@$40," "4@$30" and "5@$24." The intent processing system 502 may associate these personalized intent phrases with the sample intent phrase and the corresponding intent cluster such that customer selection of any personalized intent phrase may be used to identify corresponding intent terms/phrases and/or actions that may be performed according to the intent.

If the customer selects a particular intent term or phrase 506 from the word cloud 504, the intent processing system 502 may dynamically update the word cloud 504 to present, from the intent cluster, any intent terms and/or phrases 508 that are directly associated with the selected intent term of phrase 506. For example, the intent processing system 502 may dynamically rotate or otherwise manipulate the spherical object corresponding to the intent cluster to present one or more intent terms and/or phrases 508 directly related to the selected intent term or phrase 506. As an illustrative example, if the customer selects the intent phrase "3@$40," the intent processing system 502 may identify the intent terms and phrases "Check," "Apple Pay®," and "Credit Card" as being directly related to the selected intent phrase. The intent processing system 502 may rotate or otherwise manipulate the spherical object corresponding to the intent cluster to prominently feature the intent terms and phrases "Check," "Apple Pay®," and "Credit Card" via the interface 512. In some instances, the intent processing system 502 may further highlight these directly related intent phrases 508 to enable the customer to immediately identify related intent phrases that may correspond to the customer's intent, as described above.

In some instances, the customer, via a dialog field 510, may further communicate with the intent processing system 502 to provide additional context with regard to its issue or intent. This additional context may be used by the intent processing system 502 to determine which intent terms and/or phrases may correspond to the customer's issue or intent. As an illustrative example, if the customer inputs, into the dialog field 510, the message "I'd like to schedule 3 payments," the intent processing system 502 may process this message using NLP to identify the intent phrase 506 ("3@$40") from the intent cluster presented in the word cloud 504. Based on this identification of the intent phrase 506, the intent processing system 502 may, dynamically and in real-time, manipulate the graphical representation of the spherical object corresponding to the intent cluster to present the most likely intent match (e.g., "3@$40"). For instance, the intent processing system 502 may orient the intent cluster within the word cloud 504 such that the identified intent terms and/or phrases are presented closer to the front of the computing device. This may allow the customer to select the prominently displayed intent term or phrase from the intent cluster and continue with submission of its issue or intent.

Figure 6:
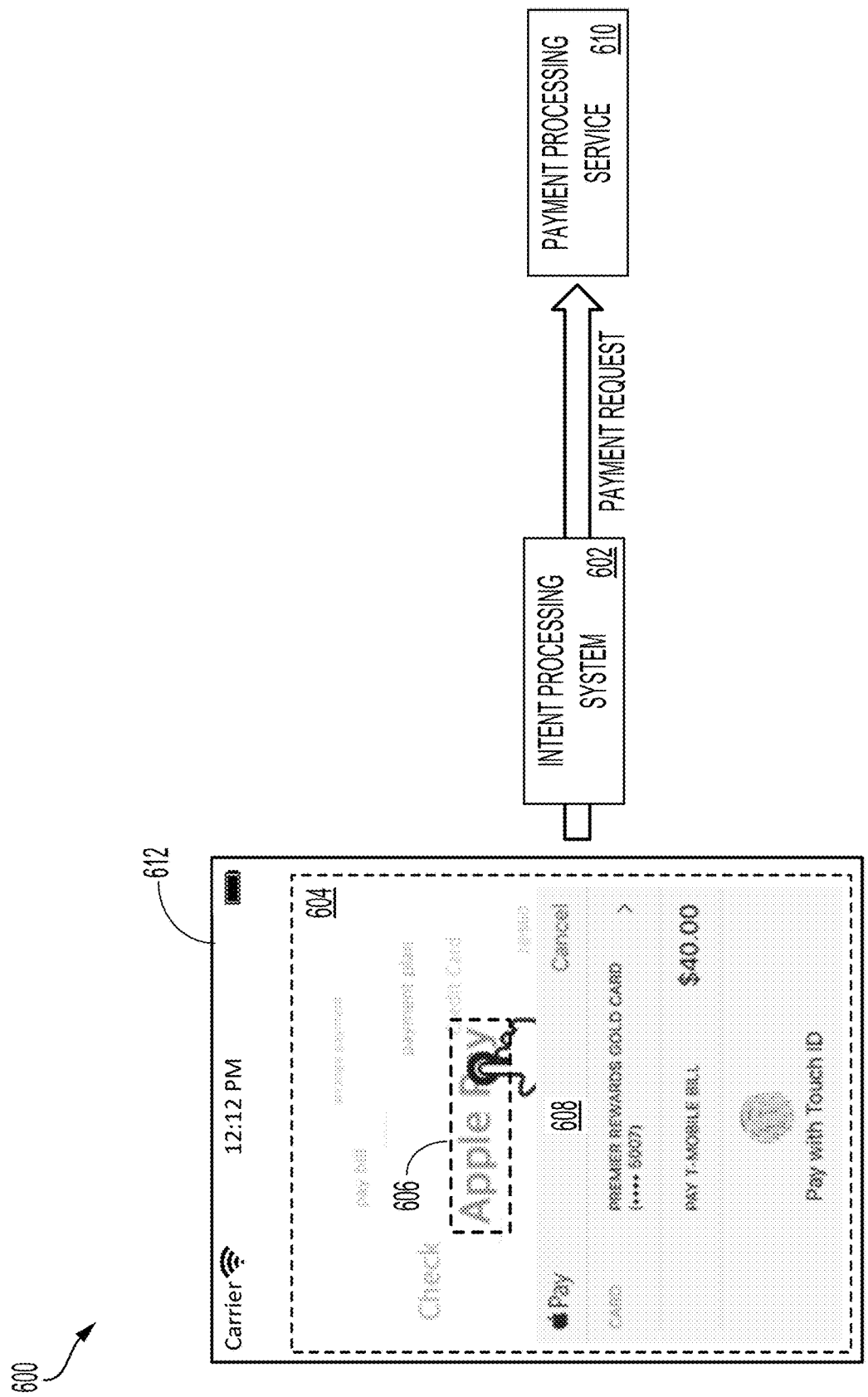
FIG. 6 shows an illustrative example of an environment in which the intent processing system executes one or more actions based on selection of one or more intent terms associated with the one or more actions in accordance with at least one embodiment.

FIG. 6 shows an illustrative example of an environment 600 in which the intent processing system 602 executes one or more actions based on selection of one or more intent terms 606 associated with the one or more actions in accordance with at least one embodiment. In the environment 600, the intent processing system 602 may detect that the customer has selected an intent term or phrase 606 from an intent cluster that is associated with one or more actions that may be performed to address a particular intent or issue. For example, as illustrated in FIG. 6, when the customer selects the intent phrase 606 ("Apple Pay®") from the word cloud 604 presented via the interface 612, the intent processing system 602 may evaluate the intent phrase 606 to determine whether the intent phrase 606 is associated with one or more actions that may be performed for the customer.

As noted above, as the customer continues to select intent terms and/or phrases from the word cloud 604, the intent processing system 602 may use a string of the selected intent terms and/or phrases to determine whether the string of the selected intent terms and/or phrases define a particular customer intent for which one or more actions may be performed to address the intent. For example, if the customer selects the intent phrases "arrange payments," "3@$40," and "Apple Pay®," the intent processing system 602 may determine that the customer wishes to pay an initial payment of $40 using Apple Pay® for a particular account. Further, the intent processing system 602 may determine that the customer wishes to make three payments to the account over a period of time (e.g., monthly payments, etc.). Accordingly, the intent processing system 602 may update the customer's account to define a payment schedule for the customer according to the selected terms and transmit billing information to Apple Pay® on the customer's computing device to obtain an initial payment. The customer may be provided with information related to the payment via an Apple Pay® payment window 608, through which the customer may approve the payment.

Continuing with the illustrative example illustrated in FIG. 6, when the customer authorizes the payment via the payment window 608, Apple Pay® (or other digital wallet service or application on the customer's computing device) may transmit payment information to a payment processing service 610 associated with the brand to fulfill the customer's intent or issue. The payment processing service 610 may transmit a receipt or other confirmation to the intent processing system 602 to indicate that the customer's payment has been processed according to the customer's intent or issue. This may cause the intent processing system 602 to update the interface 612 to provide the customer with a digital receipt or other confirmation for the payment.

It should be noted that the one or more actions performable to address the intent may include actions not associated with payments or billing issues. For instance, if the intent processing system 602 identifies, based on the customer's selection of intent terms and/or phrases via the interface 612, an intent, the intent processing system 602 can determine to which endpoint communication is to be routed. For instance, if the customer has previously communicated with a given agent, communication routing can be generally biased towards the same agent. Other factors that may influence routing once an intent has been identified based on customer interaction with the interface 612 and selection of intent terms and/or phrases can include, for example, an inferred or identified customer or agent sentiment pertaining to the previous communication; a topic of a present communication (e.g., and an extent to which that relates to a topic of a previous communication and/or a knowledge base associated with one or more agents); whether the agent is available; and/or a predicted response latency of the computing device utilized by the agent. If the customer has not previously communicated with a given agent, an agent selection can be performed as described above.

Figure 7:
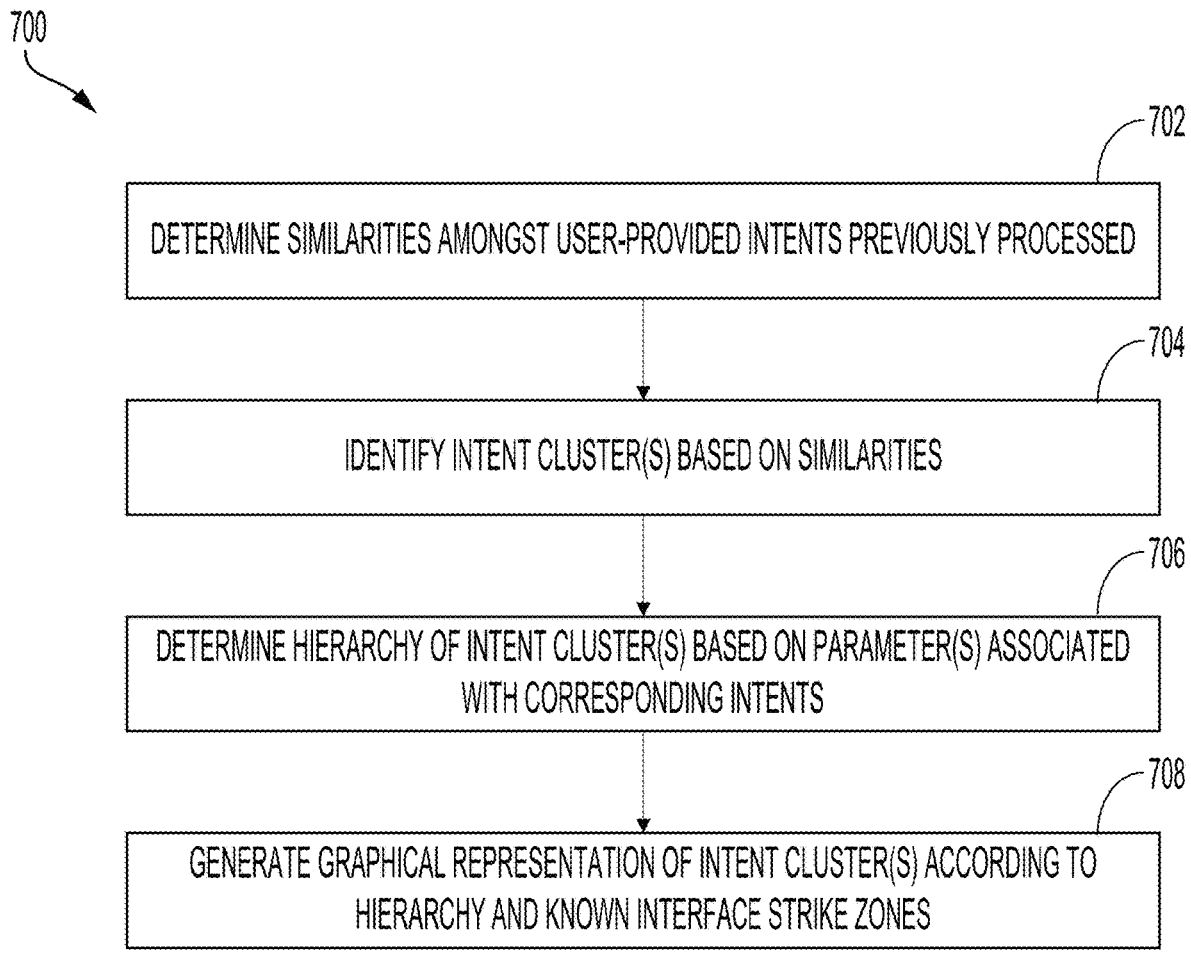
FIG. 7 shows an illustrative example of a process for generating intent clusters based on similarities amongst intents and intent terms for presentation to customers via an interface in accordance with at least one embodiment.

FIG. 7 shows an illustrative example of a process 700 for generating intent clusters based on similarities amongst intents and intent terms for presentation to customers via an interface in accordance with at least one embodiment. The process 700 may be performed by an intent processing system of a brand interaction platform. At step 702, the intent processing system may determine similarities amongst user-provided intents previously processed during communications between customers and agents/other services associated with a particular brand. For instance, the intent processing system may utilize a machine learning algorithm or artificial intelligence configured to use historical conversation data for customers associated with the brand as input to identify relationships between different intent terms and/or phrases for various intents. As noted above, the machine learning algorithm or artificial intelligence may be trained using unsupervised training techniques. For instance, a dataset of input messages and corresponding intents may be analyzed using a clustering algorithm to identify correlations between different types of intent terms and/or phrases with different intents or intent types.

At step 704, the intent processing system may identify one or more intent clusters based on the identified similarities amongst the various intent terms and/or phrases identified from the historical conversation data. For instance, the output of the machine learning algorithm or artificial intelligence generated using the dataset of input messages and corresponding intents may include classifications of the various intent terms and/or phrases according to different clusters associated with particular intents. Thus, based on this output, the intent processing system may classify certain intent terms and/or phrases as being associated with particular intents. As a result, each known intent may be associated with a variety of intent terms and/or phrases that are commonly used by customers of the brand in messages exchanged with agents and/or other services when expressing an issue or intent that they would like addressed.

At step 706, the intent processing system may determine the hierarchy of intent clusters based on parameters associated with the corresponding intents. As noted above, the intent processing system may perform an analysis of previously identified intents for customers of the brand to determine the frequency in which the identified intents have been detected over a period of time. For instance, the intent processing system may aggregate all intents detected or otherwise processed over a pre-defined period of time (e.g., daily, weekly, monthly, etc.) for myriad customers of the brand and perform a statistical analysis of the aggregated intents to determine the popularity or frequency of each intent over the pre-defined period of time. For example, for a particular intent, the intent processing system may determine the number of times the intent was detected over the pre-defined period of time. Using this number, the intent processing system may determine a percentage corresponding to the frequency at which the intent was detected compared to other intents.

As noted above, the graphical representation of spherical objects presented via the GUI provided by the intent processing system may correspond to the top-level clusters corresponding to the most popular intents detected by the intent processing system from communications between customers and agents or other services. In an embodiment, the intent processing system 302 can use one or more clustering algorithms or artificial intelligence to define the number of top-level clusters to be graphically represented within the GUI using spherical objects. For instance, the intent processing system may utilize a combination of TFIDF, SVD, and a K-means clustering algorithm with labels to define the number of top-level clusters. Based on the analysis of previously identified intents for customers of the brand to determine the frequency in which the identified intents have been detected over a period of time, the intent processing system may perform a statistical analysis of the aggregated intents to determine the popularity or frequency of each intent over a pre-defined period of time. For example, for a particular intent, the intent processing system may determine the number of times the intent was detected over the pre-defined period of time. Using this number, the intent processing system may identify the more popular or frequent intents that may be used to define the hierarchy of intent clusters.

At step 708, the intent processing system may generate a graphical representation of the intent clusters according to the determined hierarchy of intent clusters and known interface strike zones. As noted above, the size of each of the graphical representations of spherical objects is proportional to how close the spherical object is to the front of the customer's computing device and to the strike zones of the GUI. For instance, a graphical representation of a spherical object may have a greater size within a primary strike zone of the GUI (e.g., portion of the GUI where customer interaction is greatest), whereas a graphical representation of a spherical object may have a smaller size within a secondary strike zone of the GUI (e.g., portion of the GUI where customer interaction is intermitted or not as frequent as the primary strike zone). As the spherical objects drift from the primary and secondary strike zones of the GUI, the size of these spherical objects may continue to decrease until a minimum size threshold is reached.

Each spherical object presented via the GUI may correspond to a cluster of intent terms and/or phrases associated with a particular intent. In some instances, the intent processing system, via the GUI, may present a master spherical object corresponding to a top-level cluster of intent terms and/or phrases associated with the most popular intent and one or more sub-level spherical objects corresponding to lower level clusters of intent terms and/or phrases corresponding to less popular intents. The size of each of the one or more spherical objects may correspond to the hierarchy of the intent clusters, where the hierarchy corresponds to the frequency in which the associated intents are detected by the intent processing system over a period of time (e.g., weekly, monthly, etc.).

It should be noted that the process 700 may be performed using additional and/or alternative steps. For instance, the graphical representation of the one or more intent clusters may be generated independent of the known interface strike zones. As an illustrative example, the intent processing system can use one or more clustering algorithms or artificial intelligence to define the number of top-level clusters to be graphically represented within the GUI using spherical objects. The intent processing system may utilize a TFIDF, SVD, and a K-means clustering algorithm with labels to define the number of top-level clusters. While the top-level clusters may be identified based on the hierarchy of intent clusters, the intent processing system may configure each graphical representation of a spherical object within the GUI to rotate along an individual axis automatically. Further, the spherical objects may be configured to behave in a fashion similar to that of a solar system, whereby the spherical objects may rotate along a central axis, serving as satellites around an invisible spherical object. As the spherical objects rotate along this central axis, the size of each spherical object 306 may automatically and dynamically change based on its proximity to the front of the computing device and the primary and secondary strike zones described above. Thus, the size and movement of the top-level clusters within the GUI may be independent of the hierarchy of intent clusters determined by the intent processing system.

Figure 8:
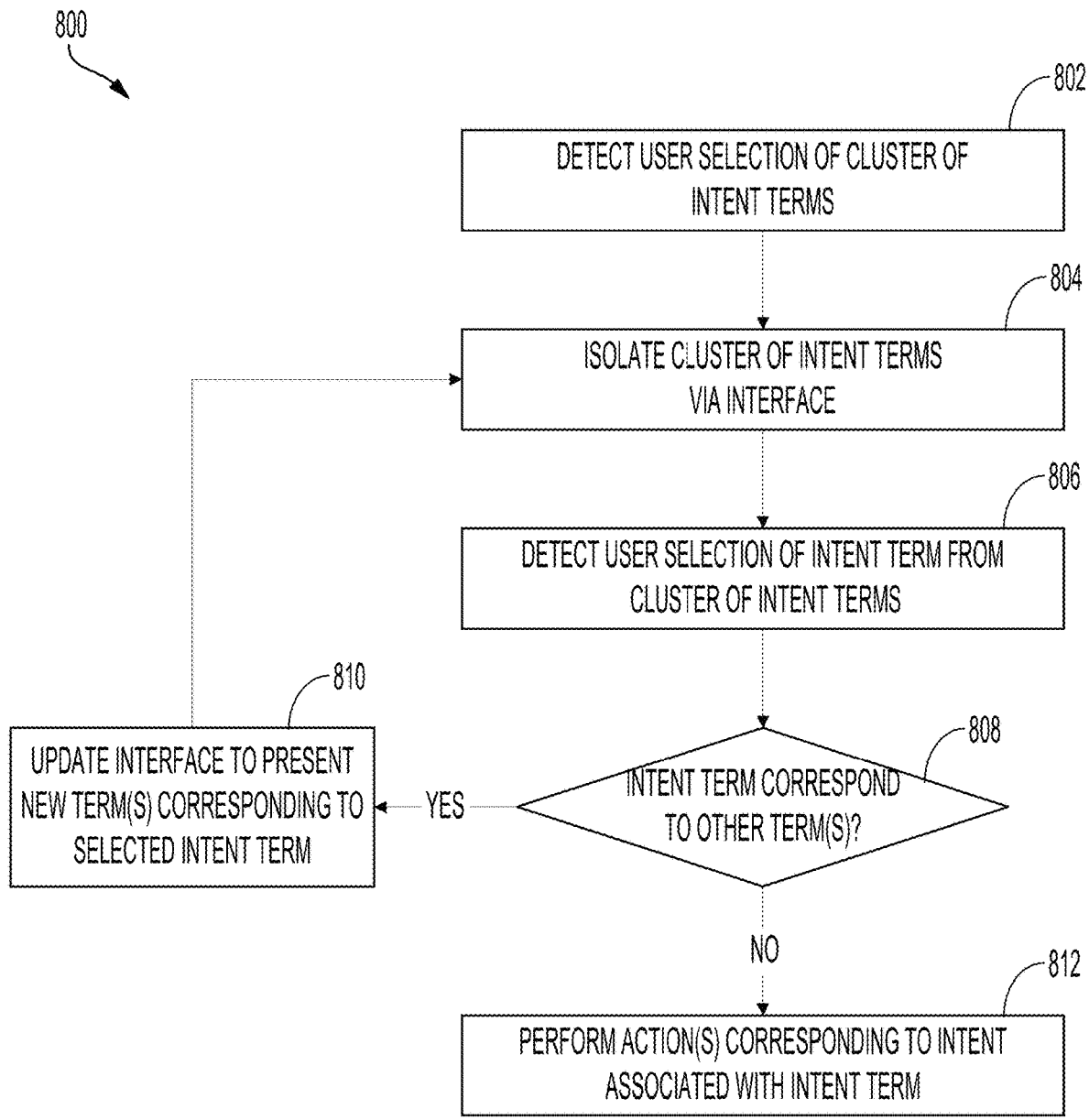
FIG. 8 shows an illustrative example of a process for performing one or more actions based on a selection of one or more intent terms from a cluster of intent terms presented via an interface in accordance with at least one embodiment.

FIG. 8 shows an illustrative example of a process 800 for performing one or more actions based on a selection of one or more intent terms from a cluster of intent terms presented via an interface in accordance with at least one embodiment. The process 800 may be performed by the intent processing system of a brand interaction platform. At step 802, the intent processing system may detect user selection of a particular cluster of intent terms. As noted above, a customer accessing the brand interaction platform may be presented with an interface, through which the customer may interact with a word cloud to define an intent or issue that may be resolved by the intent processing system. The intent processing system may present, via the interface, a word cloud comprising graphical representations of spherical objects. Each of these graphical representations of spherical objects may correspond to a top-level cluster of intent terms and/or phrases associated with a particular intent. The graphical representations of spherical objects may be sized according to their proximity to primary and second strike zones of the interface and to the front of the customer's computing device.

If the customer selects an intent term or phrase from a graphical representation of the spherical object corresponding to a top-level cluster, the intent processing system, at step 804, may isolate the selected cluster of intent terms via the interface. For instance, the intent processing system may update the interface to only present the spherical object corresponding to the selected top-level cluster within the word cloud. The intent processing system may remove the graphical representations of the other spherical objects to allow the customer to focus solely on the top-level cluster corresponding to the selected intern term or phrase. Further, the customer may view, via the interface, the other intent terms and/or phrases belonging to the top-level cluster, which may allow the customer to select other intent terms and/or phrases to further define its issue or intent.

At step 806, the intent processing system may detect user selection of an intent term from the isolated cluster of intent terms and/or phrases corresponding to a particular intent. For instance, a customer may utilize a cursor or other interaction element (e.g., a finger or stylus for touchscreen display elements, etc.) to manipulate the spherical object corresponding to the intent cluster along one or more degrees of freedom. Further, the customer may utilize the cursor or other interaction element to select an intent term or phrase from the isolated cluster to further define its intent or issue. If the customer selects a particular intent term or phrase, the intent processing system may detect this selection.

At step 808, the intent processing system may determine whether the selected intent term or phrase corresponds to other intent terms or phrases for a particular intent. If the intent processing system determines that the selected intent term or phrase corresponds to other intent terms or phrases for a particular intent, the intent processing system, at step 810, may update the interface to present these other intent terms or phrases and return to step 804, where the intent processing system may isolate the cluster of intent terms to highlight these other intent terms or phrases. For instance, the intent processing system may dynamically update the interface to present, from the intent cluster, any intent terms and/or phrases that are directly associated with the selected intent term of phrase. For example, the intent processing system may dynamically rotate or otherwise manipulate the spherical object corresponding to the intent cluster to present one or more intent terms and/or phrases directly related to the selected intent term or phrase. In some instances, the intent processing system may further highlight these directly related intent terms and/or phrases to enable the customer to immediately identify related intent phrases that may correspond to the customer's intent, as described above.

If the intent processing system determines that the selected intent term or phrase does not correspond to any other intent terms or phrases from the intent cluster, the intent processing system, at step 812, can perform one or more actions corresponding to the intent associated with the selected intent terms and/or phrases. As an illustrative example, if the customer selects the intent phrases "arrange payments," "3@$40," and "Apple Pay®," the intent processing system may determine that the customer wishes to pay an initial payment of $40 using Apple Pay® for a particular account. Further, the intent processing system may determine that the customer wishes to make three payments to the account over a period of time (e.g., monthly payments, etc.). Accordingly, the intent processing system may update the customer's account to define a payment schedule for the customer according to the selected terms and transmit billing information to Apple Pay® on the customer's computing device to obtain an initial payment. The customer may be provided with information related to the payment via an Apple Pay® payment window, through which the customer may approve the payment. Further, when the customer authorizes the payment via the payment window, Apple Pay® (or other digital wallet service or application on the customer's computing device) may transmit payment information to a payment processing service associated with the brand to fulfill the customer's intent or issue.

Figure 9:
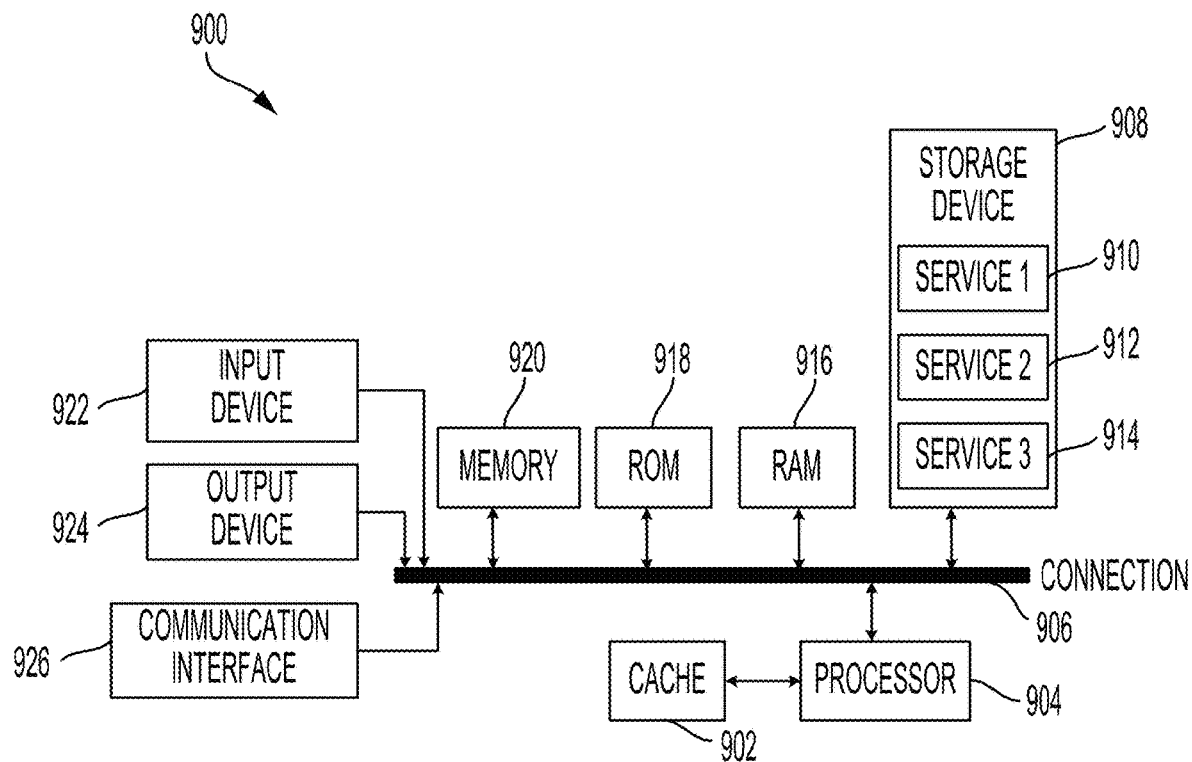
FIG. 9 shows an illustrative example of an environment in which various embodiments can be implemented.

FIG. 9 illustrates a computing system architecture 900 including various components in electrical communication with each other using a connection 906, such as a bus, in accordance with some implementations. Example system architecture 900 includes a processing unit (CPU or processor) 904 and a system connection 906 that couples various system components including the system memory 920, such as ROM 918 and RAM 916, to the processor 904. The system architecture 900 can include a cache 902 of high-speed memory connected directly with, in close proximity to, or integrated as part of the processor 904. The system architecture 900 can copy data from the memory 920 and/or the storage device 908 to the cache 902 for quick access by the processor 904. In this way, the cache can provide a performance boost that avoids processor 904 delays while waiting for data. These and other modules can control or be configured to control the processor 904 to perform various actions.

Other system memory 920 may be available for use as well. The memory 920 can include multiple different types of memory with different performance characteristics. The processor 904 can include any general purpose processor and a hardware or software service, such as service 1 910, service 2 912, and service 3 914 stored in storage device 908, configured to control the processor 904 as well as a special-purpose processor where software instructions are incorporated into the actual processor design. The processor 904 may be a completely self-contained computing system, containing multiple cores or processors, a bus, memory controller, cache, etc. A multi-core processor may be symmetric or asymmetric.

To enable user interaction with the computing system architecture 900, an input device 922 can represent any number of input mechanisms, such as a microphone for speech, a touch-sensitive screen for gesture or graphical input, keyboard, mouse, motion input, speech and so forth. An output device 924 can also be one or more of a number of output mechanisms known to those of skill in the art. In some instances, multimodal systems can enable a user to provide multiple types of input to communicate with the computing system architecture 900. The communications interface 926 can generally govern and manage the user input and system output. There is no restriction on operating on any particular hardware arrangement and therefore the basic features here may easily be substituted for improved hardware or firmware arrangements as they are developed.

Storage device 908 is a non-volatile memory and can be a hard disk or other types of computer readable media which can store data that are accessible by a computer, such as magnetic cassettes, flash memory cards, solid state memory devices, digital versatile disks, cartridges, RAMs 916, ROM 918, and hybrids thereof.

The storage device 908 can include services 910, 912, 914 for controlling the processor 904. Other hardware or software modules are contemplated. The storage device 908 can be connected to the system connection 906. In one aspect, a hardware module that performs a particular function can include the software component stored in a computer-readable medium in connection with the necessary hardware components, such as the processor 904, connection 906, output device 924, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
generating a set of intent clusters, wherein the set of intent clusters are generated using a machine learning algorithm that is trained using historical data that includes correlations between different intent terms and intents;
determining a hierarchy corresponding to the set of intent clusters, wherein the hierarchy is determined using the historical data;
presenting the set of intent clusters through a graphical user interface (GUI), wherein the set of intent clusters is manipulatable through the GUI via real-time interactions, wherein an intent cluster includes different intent terms associated with an intent, and wherein manipulation of the intent cluster causes the different intent terms to move according to the manipulation;
arranging the set of intent clusters within the GUI according to the hierarchy and a set of strike zones corresponding to frequencies of interactions with the GUI, and wherein a primary strike zone corresponds to an area of most frequent interaction with the GUI;
detecting an interaction with an intent term through the GUI, wherein the intent term corresponds to a selected intent cluster;
dynamically manipulating the GUI in real-time based on the interaction, wherein the GUI is dynamically manipulated to present the selected intent cluster corresponding to the intent term within the primary strike zone, wherein the selected intent cluster is presented through the GUI with other intent terms associated with the selected intent cluster;
detecting an interaction with a new intent term through the GUI, wherein the new intent term is selected from the other intent terms;
performing an action associated with the intent term and the new intent term; and
retraining the machine learning algorithm according to feedback corresponding to the action performed based on the intent term and the new intent term, wherein when the machine learning algorithm is retrained, the machine learning algorithm updates the hierarchy corresponding to the set of intent clusters such that the set of intent clusters are arranged within the GUI according to the updated hierarchy.

2. The computer-implemented method of claim 1, wherein the set of intent clusters are graphically represented through the GUI using a set of spherical objects, and wherein a spherical object includes a particular set of intent terms associated with a particular intent cluster.

3. The computer-implemented method of claim 1, wherein the set of intent clusters correspond to a set of frequently detected intents, and wherein the set of frequently detected intents are identified based on an evaluation of historical conversation data collected over a period of time.

4. The computer-implemented method of claim 1, further comprising:
detecting a spike in requests associated with one or more intents; and
updating in real-time the set of intent clusters in response to the spike.

5. The computer-implemented method of claim 1, further comprising:
updating the set of intent clusters through the GUI according to a request to promote a product, wherein the request specifies one or more intents associated with the product.

6. The computer-implemented method of claim 1, further comprising:
using the machine learning algorithm to determine a number of intent clusters to be included in the set of intent clusters.

7. The computer-implemented method of claim 1, wherein the set of intent clusters are sized through the GUI according to the hierarchy and the set of strike zones.

8. A system, comprising:
one or more processors; and
memory storing thereon instructions that, as a result of being executed by the one or more processors, cause the system to:
generate a set of intent clusters, wherein the set of intent clusters are generated using a machine learning algorithm that is trained using historical data that includes correlations between different intent terms and intents;
determine a hierarchy corresponding to the set of intent clusters, wherein the hierarchy is determined using the historical data;
present the set of intent clusters through a graphical user interface (GUI), wherein the set of intent clusters is manipulatable through the GUI via real-time interactions, wherein an intent cluster includes different intent terms associated with an intent, and wherein manipulation of the intent cluster causes the different intent terms to move according to the manipulation;
arrange the set of intent clusters within the GUI according to the hierarchy and a set of strike zones corresponding to frequencies of interactions with the GUI, and wherein a primary strike zone corresponds to an area of most frequent interaction with the GUI;
detect an interaction with an intent term through the GUI, wherein the intent term corresponds to a selected intent cluster;
dynamically manipulate the GUI in real-time based on the interaction, wherein the GUI is dynamically manipulated to present the selected intent cluster corresponding to the intent term within the primary strike zone, wherein the selected intent cluster is presented through the GUI with other intent terms associated with the selected intent cluster;

detect an interaction with a new intent term through the GUI, wherein the new intent term is selected from the other intent terms;

perform an action associated with the intent term and the new intent term; and retrain the machine learning algorithm according to feedback corresponding to the action performed according to the intent term and the new intent term, wherein when the machine learning algorithm is retrained, the machine learning algorithm updates the hierarchy corresponding to the set of intent clusters such that the set of intent clusters are arranged within the GUI according to the updated hierarchy.

9. The system of claim 8, wherein the set of intent clusters are graphically represented through the GUI using a set of spherical objects, and wherein a spherical object includes a particular set of intent terms associated with a particular intent cluster.

10. The system of claim 8, wherein the set of intent clusters correspond to a set of frequently detected intents, and wherein the set of frequently detected intents are identified based on an evaluation of historical conversation data collected over a period of time.

11. The system of claim 8, wherein the instructions further cause the system to:
detect a spike in requests associated with one or more intents; and
update in real-time the set of intent clusters in response to the spike.

12. The system of claim 8, wherein the instructions further cause the system to:
update the set of intent clusters through the GUI according to a request to promote a product, wherein the request specifies one or more intents associated with the product.

13. The system of claim 8, wherein the instructions further cause the system to:
use the machine learning algorithm to determine a number of intent clusters to be included in the set of intent clusters.

14. The system of claim 8, wherein the set of intent clusters are sized through the GUI according to the hierarchy and the set of strike zones.

15. A non-transitory, computer-readable storage medium storing thereon executable instructions that, as a result of being executed by one or more processors of a computer system, cause the computer system to:
generate a set of intent clusters, wherein the set of intent clusters are generated using a machine learning algorithm that is trained using historical data that includes correlations between different intent terms and intents;
determine a hierarchy corresponding to the set of intent clusters, wherein the hierarchy is determined using the historical data;
present the set of intent clusters through a graphical user interface (GUI), wherein the set of intent clusters is manipulatable through the GUI via real-time interactions, wherein an intent cluster includes different intent terms associated with an intent, and wherein manipulation of the intent cluster causes the different intent terms to move according to the manipulation;

arrange the set of intent clusters within the GUI according to the hierarchy and a set of strike zones corresponding to frequencies of interactions with the GUI, and wherein a primary strike zone corresponds to an area of most frequent interaction with the GUI;

detect an interaction with an intent term through the GUI, wherein the intent term corresponds to a selected intent cluster;

dynamically manipulate the GUI in real-time based on the interaction, wherein the GUI is dynamically manipulated to present the selected intent cluster corresponding to the intent term within the primary strike zone, wherein the selected intent cluster is presented through the GUI with other intent terms associated with the selected intent cluster;

detect an interaction with a new intent term through the GUI, wherein the new intent term is selected from the other intent terms;

perform an action associated with the intent term and the new intent term; and retrain the machine learning algorithm according to feedback corresponding to the action performed according to the intent term and the new intent term, wherein when the machine learning algorithm is retrained, the machine learning algorithm updates the hierarchy corresponding to the set of intent clusters such that the set of intent clusters are arranged within the GUI according to the updated hierarchy.

16. The non-transitory, computer-readable storage medium of claim 15, wherein the set of intent clusters are graphically represented through the GUI using a set of spherical objects, and wherein a spherical object includes a particular set of intent terms associated with a particular intent cluster.

17. The non-transitory, computer-readable storage medium of claim 15, wherein the set of intent clusters correspond to a set of frequently detected intents, and wherein the set of frequently detected intents are identified based on an evaluation of historical conversation data collected over a period of time.

18. The non-transitory, computer-readable storage medium of claim 15, wherein the executable instructions further cause the computer system to:
detect a spike in requests associated with one or more intents; and
update in real-time the set of intent clusters in response to the spike.

19. The non-transitory, computer-readable storage medium of claim 15, wherein the executable instructions further cause the computer system to:
update the set of intent clusters through the GUI according to a request to promote a product, wherein the request specifies one or more intents associated with the product.

20. The non-transitory, computer-readable storage medium of claim 15, wherein the executable instructions further cause the computer system to:
use the machine learning algorithm to determine a number of intent clusters to be included in the set of intent clusters.

21. The non-transitory, computer-readable storage medium of claim 15, wherein the set of intent clusters are sized through the GUI according to the hierarchy and the set of strike zones.

* * * * *